United States Patent
Mallett

(10) Patent No.: US 10,484,732 B2
(45) Date of Patent: Nov. 19, 2019

(54) DATA PROCESSING BACKPLANE WITH SERIAL BUS COMMUNICATION LOOP

(71) Applicant: TV One Limited, Margate (GB)

(72) Inventor: Richard Mallett, Margate (GB)

(73) Assignee: TV One Limited, Margate (GB)

(*) Notice: Subject to any disclaimer, the term of this patent is extended or adjusted under 35 U.S.C. 154(b) by 103 days.

(21) Appl. No.: 15/391,103

(22) Filed: Dec. 27, 2016

(65) Prior Publication Data

US 2017/0188074 A1 Jun. 29, 2017

Related U.S. Application Data

(60) Provisional application No. 62/272,353, filed on Dec. 29, 2015.

(51) Int. Cl.
*G06F 13/42* (2006.01)
*H04N 21/41* (2011.01)
(Continued)

(52) U.S. Cl.
CPC ....... *H04N 21/4122* (2013.01); *G06F 13/362* (2013.01); *G06F 13/385* (2013.01); *G06F 13/4063* (2013.01); *G06F 13/4068* (2013.01); *G06F 13/4282* (2013.01); *H04N 21/4183* (2013.01); *H04N 21/43635* (2013.01)

(58) Field of Classification Search
CPC combination set(s) only.
See application file for complete search history.

(56) References Cited

U.S. PATENT DOCUMENTS 4,356,404 A 10/1982 Comfort et al.
5,317,402 A 5/1994 Wong et al.
(Continued)

FOREIGN PATENT DOCUMENTS

WO WO-0186454 A2 11/2001

OTHER PUBLICATIONS

"European Application Serial No. 16207194.8, Response filed Jan. 4, 2018 toExtended European Search Report dated Apr. 5, 2017", 29 pgs.
(Continued)

*Primary Examiner* — Raymond N Phan
(74) *Attorney, Agent, or Firm* — Schwegman Lundberg & Woessner, P.A.

(57) ABSTRACT

Systems, devices, and methods according to the present disclosure can include a backplane device for exchanging audio information, video information, or other data among multiple audio, video, and/or data (AVD) processing or storage hardware modules. The backplane device includes a group of AVD module slots, and each of the module slots can receive an AVD processing hardware module, an AVD storage hardware module, or other signal processing hardware module. The backplane device includes a serial bus communication loop to couple each of the AVD module slots. The serial bus communication loop is maintained even when an AVD module slot of the backplane device is unoccupied by a hardware module. In an example, multiple backplane devices according to the present disclosure can be daisy-chained together, and packetized information can be exchanged among modules in any of the multiple backplane devices using the communication loop.

20 Claims, 10 Drawing Sheets

(51) Int. Cl.
*G06F 13/40* (2006.01)
*G06F 13/362* (2006.01)
*G06F 13/38* (2006.01)
*H04N 21/418* (2011.01)
*H04N 21/4363* (2011.01)

(56) References Cited

U.S. PATENT DOCUMENTS

| | | | |
|---|---|---|---|
| 5,486,877 A * | 1/1996 | Tanaka | H04B 1/207 348/705 |
| 6,253,114 B1 * | 6/2001 | Takihara | G11B 27/002 700/17 |
| 6,275,882 B1 * | 8/2001 | Cheever | G06F 1/1632 710/302 |
| 6,363,470 B1 | 3/2002 | Laurenti et al. | |
| 6,396,844 B1 | 5/2002 | Mack et al. | |
| 6,580,827 B2 * | 6/2003 | Ueda | G06F 13/4291 382/232 |
| 6,912,613 B2 * | 6/2005 | Lee | G06F 13/4063 710/10 |
| 7,103,753 B2 | 9/2006 | Crane, Jr. | |
| 7,369,157 B2 | 5/2008 | Kim | |
| 7,711,883 B2 * | 5/2010 | Son | H04N 21/4104 709/224 |
| 8,269,892 B2 * | 9/2012 | Asada | G09G 5/006 348/554 |
| 8,548,323 B2 | 10/2013 | Hirth et al. | |
| 9,575,917 B1 * | 2/2017 | Zhu | G06F 13/385 |
| 2002/0055278 A1 | 5/2002 | Lee et al. | |
| 2006/0061964 A1 * | 3/2006 | Cheng | G06F 1/1632 361/679.41 |
| 2012/0154513 A1 | 6/2012 | Su | |
| 2012/0195548 A1 | 8/2012 | Brunner et al. | |

OTHER PUBLICATIONS

"European Application Serial No. 16207194.8, Extended European Search Report dated Apr. 5, 2017", 9 pgs.

* cited by examiner

DATA PROCESSING BACKPLANE WITH SERIAL BUS COMMUNICATION LOOP

BACKGROUND

A video wall includes multiple visual display units, such as including one or more computer monitors, video projectors, or television sets. Some display technologies that can be used in a video wall include an LCD panel, an LED array, a DLP tile array, or a rear projection screen, among others. Visual display units in a video wall can be tiled contiguously or in an overlapping manner to provide a larger display area than would be otherwise available using only a single visual display unit. In some examples, different types of displays (e.g., computer monitors and video projectors) can be used together in a video wall or other video system installation.

Visual display units designed for use in a video wall can be substantially frameless or have narrow bezels to minimize gaps between active display areas. Some visual display units include hardware that can be used to couple or stack multiple units together, along with electrical or optical communication ports to receive power, video, or other data signals from a central controller.

A simple video wall can be controlled using a multi-monitor video card, such as from a personal computer. More complex video wall arrangements can use a dedicated video wall controller with one or more dedicated video processing circuits, such as can be designed primarily to manage large video walls. A video wall controller can receive image information and apportion the image information into multiple parts corresponding to one or more display units that are available for use in a video wall.

A hardware-based video wall controller can include an application-specific device that includes one or more video processing chipsets, and may not include a dedicated operating system. An advantage of using a hardware-based video wall controller can include improved reliability and performance over a software-based controller. However, such hardware-based controllers can be expensive and lack flexibility, and may therefore be impractical for atypical video wall applications, or for applications with display unit arrangements that change frequently. One example of a hardware-based video wall controller includes a single-input multiple-output scaler. The scaler can receive one video input signal and divide image information from the video input signal into multiple parts corresponding to different visual display units.

A software-based video wall controller can include a computer configured to operate software that controls multiple different graphic output devices, such as multiple different video cards in a personal computer system. An advantage of using a software-based video wall controller can include increased flexibility because a user can configure the software to work with a particular available video display unit and driver hardware arrangement. However, a disadvantage can be that implementation of a software-based video wall controller depends upon speed and reliability characteristics of the underlying computer system.

A video wall including multiple video display units can receive video information over an IP (internet protocol) network, sometimes called Video over IP. In Video over IP, a standard video codec can be used to reduce video program information to a bitstream (e.g., an MPEG transport stream including packetized data), and then an IP network can be used to carry the bitstream to a specified one of multiple video display units, such as using a Real-time Transport Protocol (RTP or RTTP). Video information exchanged using IP is time-critical and generally is prioritized in a Video over IP system (e.g., over non-time-critical configuration or other data exchanged over the network) to maintain a minimum quality of service.

A matrix switch can be used in video wall or other video-based systems. A matrix switch includes multiple inputs and outputs wherein any one of the inputs can be selectively connected to any one or more of the outputs. In some examples, a matrix switch can be used in audio, video, or other systems for routing signals to numerous output devices from one or more input devices, and can be controlled manually using one or more physical switches, or can be controlled automatically using a computer. Some matrix switches include internal, non-scalable backplanes that fix a number of inputs and outputs of the matrix switch. In other examples, an expandable matrix switching system can be used.

SUMMARY

The present inventor has recognized that a problem to be solved includes providing a modular data processing system that is configurable by a user to meet a wide variety of system requirements, is cost-effective, and is expandable and upgradable to keep pace with changing standards. As an example, the present inventor has further recognized that the problem includes providing a system for use in audio, video, and data signal processing, such as can be used to receive, process, and distribute video signals for use with a multiple-display installation such as a video wall.

The present subject matter can help to provide a solution to these problems and others, such as using systems, devices, and methods that include a backplane device for exchanging audio information, video information, or other data among multiple audio, video, and/or data (AVD) processing or storage hardware modules. The backplane device can include a group of AVD module slots, and each of the module slots can receive an AVD processing hardware module, an AVD storage hardware module, or other signal processing hardware module.

The backplane device can include a serial bus communication loop to communicatively couple each of the AVD module slots. In an example, the serial bus communication loop includes multiple parallel electrical or optical busses that can transmit information bidirectionally or unidirectionally. In an example, some of the busses can be configured for unidirectional information transmission and others can be configured for bidirectional information exchange.

The serial bus communication loop can be maintained when an AVD module slot of the backplane device is unoccupied by a hardware module. In an example, the serial bus communication loop is maintained across an unoccupied module slot using a jumper or using a switch that is integrated with the backplane device. In an example that includes using the switch, information about whether a hardware module is detected, such as from one or more module sensors, can be used to actuate the switch and thereby electrically or optically bypass an unoccupied slot.

In an example, multiple backplane devices can be daisy-chained together. Each of the multiple backplane devices can have a respective serial bus communication loop, and the system including the multiple backplane devices can have a system-wide serial bus communication loop. The system-wide serial bus communication loop optionally extends, in turn, to communicatively couple each module slot in the system. Packetized information can be exchanged among modules in any of the multiple backplane devices using the system-wide serial bus communication loop. In an example that includes multiple backplane devices, a portion of the serial bus communication loop can include a bidirectional or unidirectional data communication path that extends between two or more of the multiple backplane devices.

Various aspects of the present subject matter can be summarized as follows. Aspect 1 can include or use subject matter (such as an apparatus, a system, a device, a method, a means for performing acts, or a device readable medium including instructions that, when performed by the device, can cause the device to perform acts), such as can include or use an apparatus comprising a first backplane device for exchanging audio information, video information, and/or data among multiple audio, video, and/or data (AVD) processing or AVD storage hardware modules. In Aspect 1, the first backplane device can include a first group of AVD module slots, each of the module slots configured to receive an AVD processing or AVD storage hardware module, and a first serial bus communication loop to electrically or optically couple each of the AVD module slots in the first group of module slots. In Aspect 1, the first serial bus communication loop can be maintained even when at least one of the AVD module slots in the first group is unoccupied by an AVD processing or AVD storage hardware module.

Aspect 2 can include or use, or can optionally be combined with the subject matter of Aspect 1, to optionally include or use, for each AVD module slot of the first group, multiple parallel pairs of input/output ports corresponding to different channels, wherein each of the ports is configured to receive or transmit audio information, video information, and/or data substantially concurrently, and wherein the first serial bus includes a number of parallel data communication paths that corresponds to a number of the different channels.

Aspect 3 can include or use, or can optionally be combined with the subject matter of Aspect 2, to optionally include or use a first AVD module slot of the first group including output ports corresponding to first and second channel positions of the first AVD module slot, and a second AVD module slot of the first group including input ports corresponding to first and second channel positions of the second AVD module slot. In Aspect 3, the first serial bus communication loop can include a first information communication path that extends from the first channel position output port of the first AVD module slot to the second channel position input port of the second AVD module slot.

Aspect 4 can include or use, or can optionally be combined with the subject matter of one or any combination of Aspects 1 through 3 to optionally include or use the first serial bus communication loop being maintained through a first unoccupied AVD module slot using one of (1) a jumper inserted in the first unoccupied AVD module slot or (2) a bypass switch that is integrated with the first backplane device.

Aspect 5 can include or use, or can optionally be combined with the subject matter of Aspect 4, to optionally include or use the jumper.

Aspect 6 can include or use, or can optionally be combined with the subject matter of one or any combination of Aspects 1 through 5 to optionally include or use a second backplane device for exchanging audio information, video information, and/or data among multiple AVD processing or AVD storage hardware modules, the second backplane device comprising a second group of AVD processing or AVD storage module slots and a link module that communicatively couples the first group of AVD module slots of the first backplane device and the second group of AVD module slots of the second backplane device to provide a system-wide serial bus communication loop among all of the module slots in the first and second groups of AVD module slots.

Aspect 7 can include or use, or can optionally be combined with the subject matter of Aspect 6, to optionally include or use the second backplane device having a second serial bus communication loop to electrically or optically couple each of the module slots in the second group of AVD module slots, wherein the second serial bus communication loop is maintained even when at least one of the module slots in the second group is unoccupied by an AVD processing or AVD storage hardware module.

Aspect 8 can include or use, or can optionally be combined with the subject matter of one or any combination of Aspects 6 or 7 to optionally include or use the link module configured to further establish backplane-specific serial bus communication loops among module slots only in respective ones of the first and second groups of AVD module slots, such that the system includes the first serial bus communication loop for the first backplane device, a second serial bus communication loop for the second backplane device, and the system-wide serial bus communication loop for the first and second backplanes.

Aspect 9 can include or use, or can optionally be combined with the subject matter of Aspect 8, to optionally include or use the link module configured to exchange, between the first and second backplane devices, only information originating from one of the backplane devices that is addressed to a location in the other one of the backplane devices.

Aspect 10 can include or use, or can optionally be combined with the subject matter of one or any combination of Aspects 1 through 9 to optionally include or use the first serial bus communication loop configured to bidirectionally couple and least two of the AVD module slots in the first group of AVD module slots.

Aspect 11 can include or use, or can optionally be combined with the subject matter of one or any combination of Aspects 1 through 10 to optionally include or use the first group of AVD module slots including at least first, second, and third AVD module slots, wherein the first and second AVD module slots are communicatively coupled by a first portion of the first serial bus communication loop, and wherein the second and third AVD module slots are communicatively coupled by a second portion of the first serial bus communication loop, and wherein the first backplane device further comprises a data buffer circuit that communicatively couples the first and third AVD module slots.

Aspect 12 can include, or can optionally be combined with the subject matter of one or any combination of Aspects 1 through 11 to include or use, subject matter (such as an apparatus, a method, a means for performing acts, or a machine readable medium including instructions that, when performed by the machine, that can cause the machine to perform acts), such as can include or use an apparatus comprising a first backplane device for use in a video display control system, the first backplane device comprising a first group of video signal processing or video signal storage module slots, each of the module slots configured to receive a video signal processing or video signal storage hardware module, and a first serial bus communication loop to electrically or optically couple each of the module slots in the first group of module slots, wherein the first serial bus communication loop is maintained even when at least one of the module slots in the first group is unoccupied by a video signal processing or video signal storage hardware module.

Aspect 13 can include or use, or can optionally be combined with the subject matter of Aspect 12, to optionally include or use a first jumper, wherein the first serial bus communication loop is maintained through a first module slot in the first group, even when the first module slot is unoccupied, using the first jumper to electrically or optically provide a communication channel through the first module slot.

Aspect 14 can include or use, or can optionally be combined with the subject matter of Aspect 12, to optionally include or use a first jumper switch, wherein the first serial bus communication loop is maintained through a first module slot in the first group, even when the first module slot is unoccupied, using the first jumper switch to electrically or optically provide a communication channel through the first module slot, wherein the first jumper switch is actuated using a sensed indication about whether the first module slot is occupied.

Aspect 15 can include or use, or can optionally be combined with the subject matter of one or any combination of Aspects 12 through 14 to optionally include or use a first video signal processing hardware module coupled to a first module slot in the first group, wherein the video signal processing hardware module is configured to receive video signal information, via the first serial bus communication loop, from a different second hardware module coupled to a second module slot in the first group, and wherein the video signal processing hardware module is configured to provide a processed video signal, via the first serial bus communication loop, to a different third hardware module coupled to a third module slot in the first group.

Aspect 16 can include or use, or can optionally be combined with the subject matter of one or any combination of Aspects 12 through 15 to optionally include or use each module slot of the first group including multiple pairs of parallel data input and parallel data output channels, and wherein the first serial bus includes a number of designated data communication paths that corresponds to the multiple pairs of parallel data channels.

Aspect 17 can include or use, or can optionally be combined with the subject matter of Aspect 16, to optionally include or use a first module slot of the first group includes, in first and second data channel positions of the first module slot, first and second parallel data output ports, and a second module slot of the first group includes, in first and second data channel positions of the second module slot, third and fourth parallel data input ports. In Aspect 17, the first serial bus communication loop includes a first data communication path that extends from the first data output port to the fourth data input port, and a second data communication path that extends from the second data output port to the third data input port.

Aspect 18 can include or use, or can optionally be combined with the subject matter of one or any combination of Aspects 12 through 17 to optionally include or use first and second video signal processing hardware modules coupled to first and second module slots, respectively, in the first group, wherein multiple parallel data channels in the first serial bus communication loop are accessible via each of the first and second module slots, and wherein at least one of the first and second video signal processing hardware modules routes a video data signal from a first one of the multiple parallel data channels in the first serial bus communication loop to a different second one of the multiple parallel data channels.

Aspect 19 can include or use, or can optionally be combined with the subject matter of Aspect 18, to optionally include or use the first and second video signal processing hardware modules including respective first and second video processing circuits, wherein the first and second video processing circuits of the first and second video signal processing hardware modules are configured to process only information on the first one of the multiple parallel data channels in the first serial bus communication loop.

Aspect 20 can include or use, or can optionally be combined with the subject matter of one or any combination of Aspects 12 through 19 to optionally include or use a second backplane device for use in the video display control system, the second backplane device comprising a second group of video signal processing or video signal storage module slots, and a link module that communicatively couples the first group of module slots of the first backplane device and the second group of module slots of the second backplane device to provide a system-wide serial bus communication loop among modules coupled to any module slot in the video display control system.

Aspect 21 can include or use, or can optionally be combined with the subject matter of Aspect 20, to optionally include or use the second backplane device including a second serial bus communication loop to electrically or optically couple each of the module slots in the second group of module slots, wherein the second serial bus communication loop is maintained even when at least one of the module slots in the second group is unoccupied by a video signal processing or video signal storage hardware module.

Aspect 22 can include or use, or can optionally be combined with the subject matter of one or any combination of Aspects 20 or 21 to optionally include or use the link module to further establish backplane-specific serial bus communication loops among module slots only in respective ones of the first and second groups of module slots, such that the system includes the first serial bus communication loop for the first backplane device, a second serial bus communication loop for the second backplane device, and the system-wide serial bus communication loop for the first and second backplanes.

Aspect 23 can include or use, or can optionally be combined with the subject matter of Aspect 22, to optionally include or use the link module configured to exchange, between the first and second backplane devices, only information originating from one of the backplane devices that is addressed to a location in the other one of the backplane devices.

Aspect 24 can include or use, or can optionally be combined with the subject matter of one or any combination of Aspects 12 through 23 to optionally include or use a first video signal processing hardware module configured to process a video signal having a 4k or 8k resolution characteristic.

Aspect 25 can include or use, or can optionally be combined with the subject matter of one or any combination of Aspects 12 through 24 to optionally include or use, as at least one of the module slots, a PCIe slot.

Aspect 26 can include or use, or can optionally be combined with the subject matter of one or any combination of Aspects 12 through 25 to optionally include or use the first serial bus communication loop configured to operate at about 6 gigabits per second per channel.

Aspect 27 can include or use, or can optionally be combined with the subject matter of one or any combination of Aspects 12 through 26 to optionally include or use the first serial bus communication loop including a communication segment that provides bidirectional video data communication between a pair of video signal processing or video signal storage module slots in the first group of module slots.

Aspect 28 can include, or can optionally be combined with the subject matter of one or any combination of Aspects 1 through 27 to include or use, subject matter (such as an apparatus, a method, a means for performing acts, or a machine readable medium including instructions that, when performed by the machine, that can cause the machine to perform acts), such as can include or use a modular system comprising a first backplane device that includes a first group of module slots and a first serial bus that communicatively couples each of the module slots, wherein each slot of the first group of module slots is configured to receive a processor module or a memory module, and the first serial bus bypasses any module slot in the first group of module slots that is unoccupied by a module and a second backplane device that includes a second group of module slots and a second serial bus that communicatively couples each of the module slots, wherein each slot of the second group of module slots is configured to receive a processor module or a memory module, and the second serial bus bypasses any module slot in the second group of module slots that is unoccupied by a module. Aspect 28 can include a first processor module including at least one processor circuit, the first processor module coupled to a slot in one of the first and second groups of module slots, and the at least one processor circuit is configured to process a packetized data signal received from, or for output to, a different processor module or memory module in either of the first and second groups of module slots, and Aspect 28 can further include a link that communicatively couples the first and second groups of module slots to establish a system-level serial data loop among modules coupled to any module slot in the system.

Aspect 29 can include or use, or can optionally be combined with the subject matter of Aspect 28, to optionally include or use the first serial bus is one of an electrical bus or an optical bus that is configured to transmit one of an electrical signal or an optical signal, respectively.

Aspect 30 can include or use, or can optionally be combined with the subject matter of one or any combination of Aspects 28 or 29 to optionally include or use a jumper coupled with a first module slot in the first group of module slots, wherein the jumper provides a communication path, along a portion of the first serial bus that includes the first module slot, to bypass the first module slot.

Aspect 31 can include or use, or can optionally be combined with the subject matter of one or any combination of Aspects 28 through 30 to optionally include or use a jumper switch coupled with a first module slot in the first group of module slots, wherein actuation of the jumper switch enables or disables a communication path along a portion of the first serial bus that includes the first module slot.

Aspect 32 can include or use, or can optionally be combined with the subject matter of Aspect 31, to optionally include or use the jumper switch being software-actuated based on a sensed indication about whether the first module slot is occupied.

Aspect 33 can include or use, or can optionally be combined with the subject matter of one or any combination of Aspects 28 through 32 to optionally include or use the link to further establish first and second serial data loops among module slots only in respective ones of the first and second groups of module slots, such that the system includes the system-level serial data loop among all module slots in the system, the first serial data loop among only the first group of module slots, and the second serial data loop among only the second group of module slots.

Aspect 34 can include or use, or can optionally be combined with the subject matter of Aspect 33, to optionally include or use the link to exchange, between the first and second backplane devices, only packetized information originating from a first one of the backplane devices that is addressed to a location in the other one of the backplane devices.

Aspect 35 can include or use, or can optionally be combined with the subject matter of one or any combination of Aspects 28 through 34 to optionally include or use each module slot in the first group includes multiple pairs of parallel data input and parallel data output channels, and wherein the first serial bus includes a number of designated data communication paths that corresponds to the multiple pairs of parallel data channels.

Aspect 36 can include or use, or can optionally be combined with the subject matter of Aspect 35, to optionally include or use each module slot in the second group including multiple pairs of parallel data input and parallel data output channels, and wherein the second serial bus includes a number of designated data communication paths that corresponds to the multiple pairs of parallel data channels, and wherein the number of designated data communication paths in the first group is different than the number of designated data communication paths in the second group.

Aspect 37 can include or use, or can optionally be combined with the subject matter of one or any combination of Aspects 28 through 36 to optionally include or use the link and the link includes first and second data communication channels that couple the first and second groups of module slots to establish the system-level serial data loop, wherein the first data communication channel exchanges information from the first group to the second group of module slots, and wherein the second data communication channel exchanges information from the second group to the first group of module slots.

Each of these non-limiting aspects can stand on its own, or can be combined in various permutations or combinations with one or more of the other aspects or examples discussed herein.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
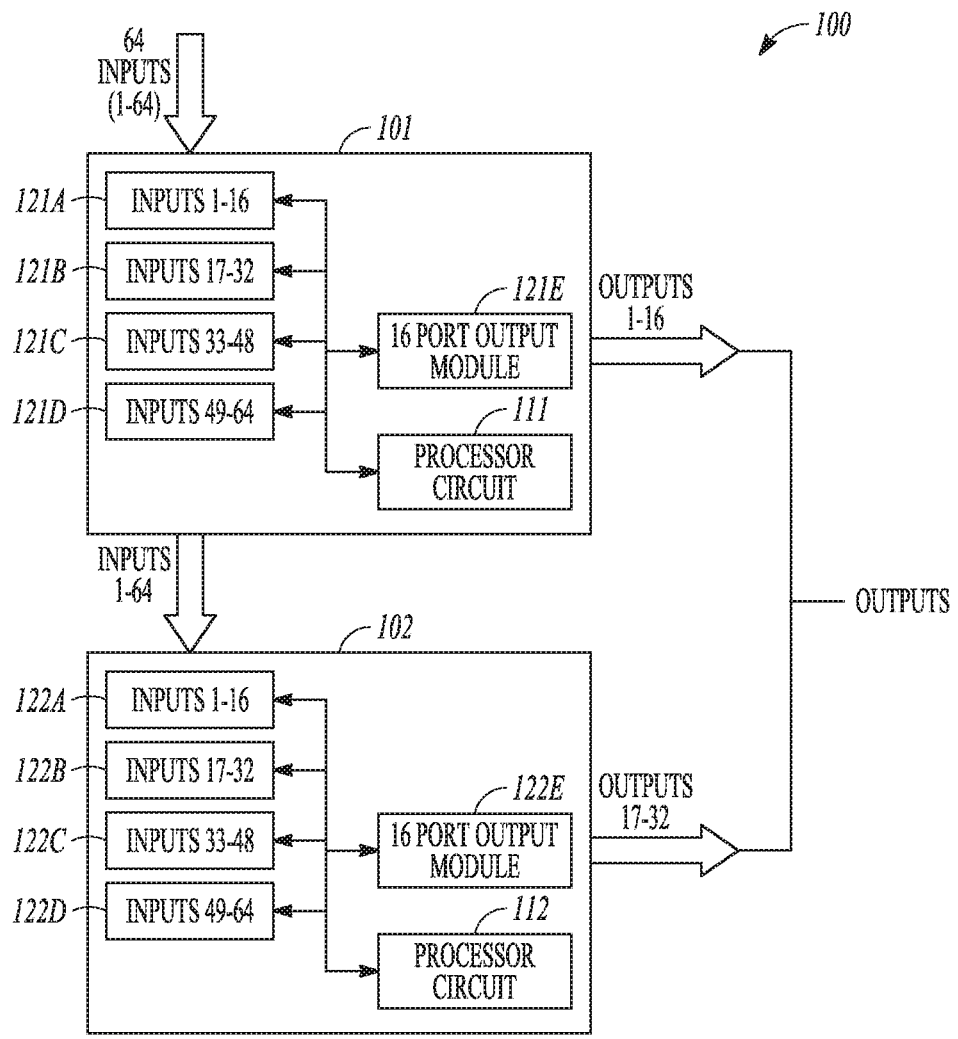
FIG. 1 illustrates generally a schematic view of a matrix system that includes multiple backplane devices.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of the elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the claims, the terms "including" and "comprising" are open-ended, that is, a system, device, article, composition, formulation, or process that includes elements in addition to those listed after such a term in a claim are still deemed to fall within the scope of that claim. Moreover, in the claims, the terms "first," "second," and "third," etc. are used merely as labels, and are not intended to impose numerical requirements on their objects.

In an example, a switching system includes one or more backplane devices for use in routing signal information, such as including audio information, video information, data, or other signals. The system can transmit signal information using electrical wires, such as twisted pair, using optical filaments or fibres, or the system can transmit signal information wirelessly, such as using an established or proprietary communication protocol. The expandable matrix switching system can receive one or more input signals and selectively process or route the input signals to one or more outputs.

In an example, each backplane device in a signal routing or matrix system is configured to receive one or more hardware modules to perform one or more different functions. For example, some hardware modules can be configured as input hardware modules to receive signal information from an external source. Another hardware module for use with the system can be configured to process an audio, video, or data signal, such as to down-convert or up-convert a signal resolution, to apply a filter, or to perform some other function using the audio, video, or data signal. Another hardware module for use with the system can be configured as a memory or signal storage device. Another hardware module for use with the system can be configured as a linking device to communicatively couple two or more backplane devices in the system, such as to expand a number of available inputs or outputs, or to increase a processing or memory capacity of the system.

Each backplane device in a system can exchange information among its hardware modules, such as using a serial bus communication loop. In a backplane device having n hardware modules, the serial bus communication loop extends from a first hardware module to a second hardware module, from the second to a third hardware module, and so on until the loop reaches an nth hardware module. The loop then extends from the nth hardware module to the first hardware module to complete the loop. In an example, a signal originating from, or processed by, a first hardware module can be communicated to any one or more other hardware modules in the system using the serial bus communication loop. For example, a signal received using an input in the second hardware module can be communicated to the first hardware module by transmitting the received signal from the second hardware module, to the third hardware module, and so on through the nth hardware module, and then to the first hardware module. In this example, the received signal would be communicated through the entire serial bus communication loop except for the loop segment that extends from the first hardware module to the second hardware module. In an example, the received signal can be communicated through the serial bus communication loop including returning to the second hardware module, such as after the signal is received at the destination or first hardware module.

A signal, such as originating from a first hardware module on a serial bus communication loop, can be removed from the serial bus communication loop by a destination hardware module to which the signal is addressed. In an example, the signal can be removed from the bus by the same first hardware module from which the signal originated. In an example, a signal can include a "time to live", or expiration information, such that when the "time to live" elapses or the expiration is reached, the signal is removed from the bus. The signal can be removed from the bus using any hardware module that can detect the expiration, or it can optionally be removed using a processor circuit on-board the backplane that is configured to monitor the bus for an expired signal.

In an example, any one or more backplane devices in a system can be substantially passive, and may not have a dedicated processor circuit on-board. Some backplane designs (see, e.g., FIG. 1) use a star-based configuration with a central processor circuit on-board each backplane device. In the star-based configuration, the central processor circuit can be a limiting or gating item in the function of the backplane device. For example, a central processor circuit on-board a backplane device may be limited in terms of speed, memory, or processing bandwidth. If a central processor circuit reaches a processing bandwidth limit (e.g., 3 gigabits per second), then a processing capacity of the system comprising the backplane device may reach a ceiling unless the processor circuit itself is upgraded.

In an example of a backplane device according to the present disclosure, substantive signal processing can be performed on-board one or more hardware modules that are coupled to a given backplane device. Information can be exchanged among the one or more hardware modules using the serial bus communication loop, such as substantially without the influence or assistance of a central processor circuit from the backplane device. By removing the central processor circuit, a complexity and cost of each backplane device can be reduced, and the system specifications can be defined by characteristics and capabilities of each of the hardware modules comprising the system, rather than by a central processor circuit on-board a backplane device. In this manner, hardware modules having different processing capacities, such as in terms of speed or number of channels, can be used together, and can be further configured to exchange information using the same backplane device, such as using a serial bus communication loop that includes multiple parallel data signal channels.

Referring now to FIG. 1, a schematic view illustrates generally an example of a first system 100 of first and second backplane devices 101 and 102 that are configured for use as switch frames. In the example of FIG. 1, the first and second backplane devices 101 and 102 are cascaded to provide a matrix switch having 64 input ports and 32 output ports. The first backplane device 101 includes a first processor circuit 111, and the second backplane device 102 includes a second processor circuit 112. The first and second processor circuits 111 and 112 can be configured to selectively route input signals to one or more destinations in accordance with commands from a central controller (not shown). In an example, separate input and output communication ports are provided on each backplane device for coupling with the central controller or with another backplane device.

The first and second backplane devices 101 and 102 include multiple respective hardware modules. For example, the first backplane device 101 includes four input modules 121A, 121B, 121C, and 121D, and one output module 121E. The second backplane device 102 similarly includes input and output modules 122A-122E. The input modules 121A-121D and 122A-122D can be configured to receive the same input signals, such as corresponding to 64 different parallel channels. Each of the output modules 121E and 122E can be configured to provide up to 16 different parallel output signals, for a total of 32 different outputs for the system 100. In an example, the modules 121A-121E and 122A-122E include female RJ-45 couplers for receiving a Cat5 twisted pair cable terminated with a corresponding male RJ-45 coupler. Other connectors can similarly be used.

In the example of FIG. 1, each of the first and second backplane devices 101 and 102 are controlled, at least in part, using the first and second processor circuit 111 and 112, respectively. The first processor circuit 111 is communicatively coupled with each of the hardware modules 121A-121E that are on-board the first backplane device 101. The first processor circuit 111 can receive video signal information from the first input module 121A, process the received video signal, and then provide the processed video signal to the output module 121E, such as with instructions or address information for identifying which of the 16 available output ports to use. The second processor circuit 112 is similarly communicatively coupled with each of the hardware modules 122A-122E that are on-board the second backplane device 102. Thus, the first and second processor circuits 111 and 112 handle most or all of the signal processing and routing in their respective backplane devices. The function, speed, and reliability of the first and second backplane devices 101 and 102 therefore depend, at least in part, on the first and second processor circuits 111 and 112.

The system 100 can be a modular system with one or more additional backplane devices provided to further scale the number of available inputs or outputs. Thus, the system 100 can be scaled and configured as needed for any particular application. In the example of FIG. 1, further vertically cascading the system 100 with additional backplane devices can increase a number of output ports which are connectable to the 64 inputs.

Figure 2A:
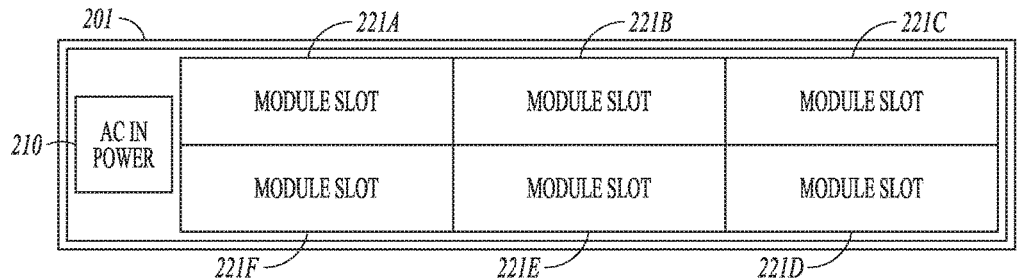
FIG. 2A illustrates generally an example of a backplane device with a serial bus communication loop.
Figure 2B:
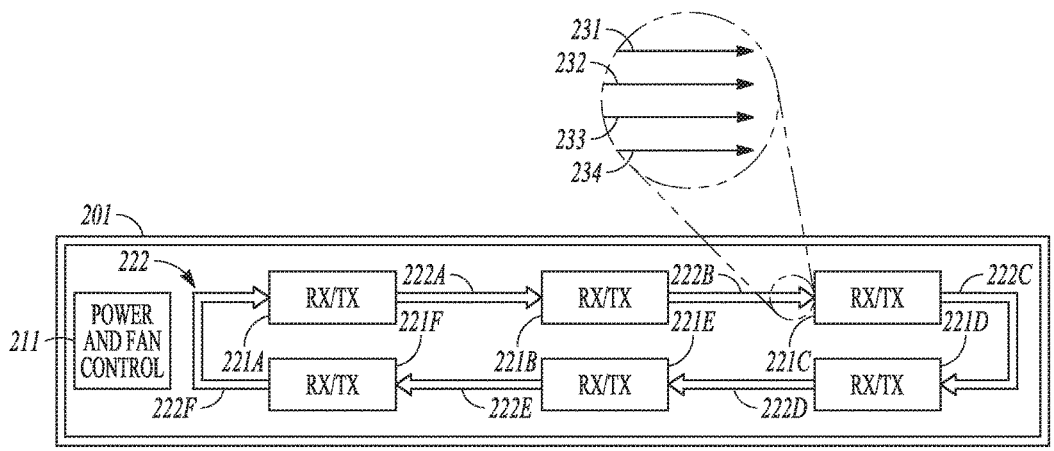
FIG. 2B illustrates generally an example of a schematic view of a serial bus communication loop.
Figure 2C:
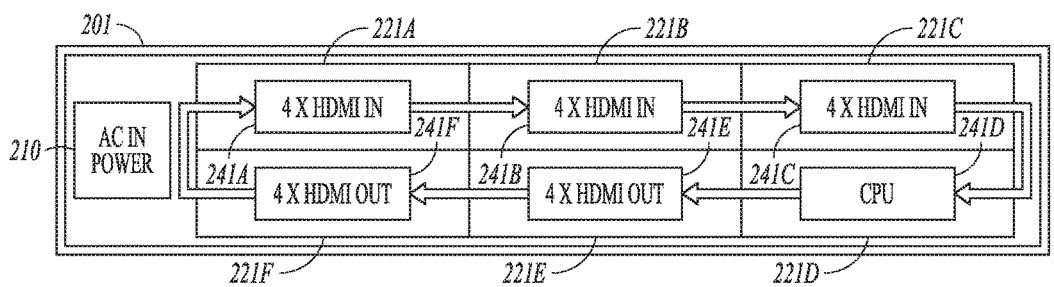
FIG. 2C illustrates generally an example of a backplane device that is populated with multiple different hardware modules.

In an example, a scalable apparatus, including a backplane device without a central processor circuit, can be used. FIG. 2A illustrates generally an example of an apparatus including a first backplane device 201 with a serial bus communication loop. FIG. 2B illustrates generally an example of a schematic view of the serial bus communication loop for the first backplane device 201 of FIG. 2A. FIG. 2C illustrates generally an example of a schematic view of the first backplane device 201 populated with multiple different hardware modules.

The apparatus in the example of FIG. 2A includes a chassis for the first backplane device 201 that encloses a power supply unit 210 and a group of module slots 221A-221F. In the example of FIG. 2A, the first backplane device 201 includes six module slots, however fewer or additional module slots can similarly be used. Each of the multiple module slots 221A-221F can have similar or dissimilar hardware connectors that are configured to receive respective hardware modules, and the hardware modules can be used for receiving, processing, storing, or transmitting audio information, video information, or other data.

The multiple module slots 221A-221F include respective terminals for providing access to electrical and/or optical communication channels in the first backplane device 201. The electrical and/or optical communication channels in the first backplane device 201 include at least a portion of a serial bus communication loop in the first backplane device 201. In an example, the serial bus communication loop includes multiple parallel channels that can be used individually for serial communication among the terminals comprising the multiple module slots 221A-221F.

In an example, at least one of the multiple module slots 221A-221F includes a Peripheral Component Interconnect (PCI) slot, or PCI Express (PCIe) slot. In an example, at least one of the multiple module slots 221A-221F includes an Extended/Industry Standard Architecture (EISA/ISA) slot, a Micro Channel Architecture (MCA) slot, or Accelerated Graphics Port slot. In an example, at least one of the multiple module slots 221A-221F includes an optical or dual-mode (e.g., electrical and optical) slot. In an example, a module slot includes a Thunderbolt or Light Peak interface socket. In other examples, a module slot can include a Serial ATA, HDMI, USB, SAS, FireWire, or RapidIO port, or other receptacle for receiving or providing an electrical or optical signal. Any one or more of the multiple module slots 221A-221F can be occupied by respective hardware modules, as further described below.

FIG. 2B illustrates generally an example of a schematic view of the first backplane device 201 including a serial bus communication loop 222. The example further includes a power and fan control unit 211, such as can be used to provide power and/or cooling to any one or more hardware modules that may be coupled to respective ones of the multiple module slots 221A-221F. In the example of FIG. 2B, each of the multiple module slots 221A-221F are represented by respective receive/transmit (RX/TX) blocks. Each of the RX/TX blocks represents an information receiving and/or information transmitting capability for the slots. For example, the first module slot 221A can be configured to receive video information using a first terminal or port that is included in the first module slot 221A, and the first module slot 221A can be configured to provide or transmit video information using a second terminal or port that is included in the first module slot 221A.

The serial bus communication loop 222 includes one or more communication channels, or lanes, that extend in a loop among the multiple module slots 221A-221F. In an example, the serial bus communication loop 222 includes multiple parallel communication channels, and each channel provides a serial communication path in the loop among the multiple module slots 221A-221F. In FIG. 2B, the serial bus communication loop 222 is represented by the thick line and includes four parallel communication channels 231-234, such as provided using multiple parallel electrical or optical busses. In an example, a single serial channel can be used, and signal information transmitted using the single serial channel can be multiplexed.

The serial bus communication loop 222 is configured to carry packetized data from one module slot to another. Packetized data generally includes header or address information, a payload, and a checksum for use in error detection. The packetized data can include audio information, video information, data such as control signal information, compressed data, or other digital signal information that can be exchanged using an electrical, optical, or wireless bus. In an example, the serial bus communication loop 222 transmits data using one or more standard protocols, such as using internet protocol (IP). For example, the serial bus communication loop 222 can transmit IP data packets including Voice over IP (VOIP) packets. Other standard or proprietary protocols can similarly be used.

In the example of FIG. 2B, the serial bus communication loop 222 includes multiple loop segments 222A-222F. The first module slot 221A is communicatively coupled with the second module slot 221B using the first loop segment 222A, the second module slot 221B is communicatively coupled with the third module slot 221C using the second loop segment 222B, and so on. The sixth module slot 221F is communicatively coupled with the first module slot 221A using the sixth loop segment 222F to complete the serial bus communication loop 222. Any one or more of the loop segments 222A-222F can include multiple parallel channels to communicatively couple the adjacent module slots. Each of the segments can include the same number of parallel channels. For example, each of the multiple module slots 221A-221F can include a PCIe slot, and the serial bus communication loop 222 can include at least 8 pairs of parallel data communication channels that include electrical or optical pathways for exchanging information around the loop.

In an example, the serial bus communication loop 222 includes multiple parallel channel or signal paths, and each segment can include channel or signal paths that are substantially similar in terms of width, length, or some other characteristic that can influence signal transmission capacity or quality. By providing substantially similar paths, signal timing skew can be reduced or substantially eliminated. In an example, the serial bus communication loop 222 is configured to carry only one differential signal in each direction within each path in the loop. In an example, an external or common clock is not used with the first backplane device 201, and instead clock information can be embedded with the serial signals that are transmitted using the serial bus communication loop 222. In some examples, signals on different channels or paths in the loop can have different clock rates, such as according to the various hardware modules coupled to the first backplane device 201.

Each of the multiple channels in the serial bus communication loop 222 can operate in a multiple-gigabit range. For example, the serial bus communication loop 222 can operate at 3, 6, or 12 gigabits per second. Speed limits can be determined at least in part by a physical capacity of the channels comprising the serial bus communication loop 222, or by the processing or clock speeds on-board one or more hardware modules in a given system. In an example that includes a video system backplane device having a serial bus communication loop with 8 parallel channels, each channel can operate at about 6 Gbps, and the total bandwidth of the backplane device can be about 48 Gbps. Using the SDI 10 bit 4:2:2 format, the video system backplane device can thus be used to process eighteen concurrent 1080p60 signals or four 4K, or Ultra High Definition, signals. Using the 8 bit 4:2:0 format, the video system backplane device can be used to process thirty-one concurrent 1080p60 signals or seven 4K signals.

In an example, a hardware module coupled to a module slot completes an electrical or optical circuit through a given module slot to provide a portion of the serial bus communication loop 222. When a module slot is unoccupied by a hardware module, such as by a data processing or data storage hardware module, the serial bus communication loop 222 can bypass the unoccupied slot to maintain communication among hardware modules coupled to the first backplane device 201. For example, if the fourth module slot 221D is unoccupied, then the third loop segment 222C can be coupled to the fourth loop segment 222D to maintain signal communication between the third module slot 221C and the fifth module slot 221E. In this example, the unoccupied fourth module slot 221D can be jumpered using a hardware jumper, such as can be inserted in or about the fourth module slot 221A.

In another example, a bypass switch, such as can be integrated with the first backplane device 201, can be used to provide the communication path about the unoccupied fourth module slot 221D. One or more sensors (e.g., mechanical, electrical, optical, etc.) can be used to determine whether a module slot is occupied or unoccupied. When a particular module slot is determined to be unoccupied, the bypass switch can be activated and the module slot can be electrically and/or optically bypassed. In an example, a multiple-channel, high-speed differential switch can be used. In an example, a switching device can include other features, such as failover support or re-timing for bus signals coupled by the switch.

FIG. 2C illustrates generally an example of a schematic view of the first backplane device 201 populated with multiple different hardware modules 241A-241F. Any suitable hardware module can be coupled with any available one of the multiple module slots 221A-221F. Thus, the example of FIG. 2C illustrates only one configuration among many possible configurations. In an example, hardware modules for use with the first backplane device 201 can be hot-swappable, that is, they can be connected to or removed from the first backplane device 201 at any time, even when the first backplane device 201 is powered-up.

In the example of FIG. 2C, first, second, and third HDMI input modules 241A, 241B, and 241C, are respectively coupled to the first, second, and third module slots 221A, 221B, and 221C. A central processing unit module 241D is coupled to the fourth module slot 221D. First and second HDMI output modules 241E and 241F are respectively coupled to the fifth and sixth module slots 221E and 221F. Each of the HDMI input modules can include 4 discrete HDMI inputs, and each of the HDMI output modules can include 4 discrete HDMI outputs. In this example, the first backplane device 201 is configured to receive up to 12 HDMI signals using the first, second, and third HDMI input modules 241A-241C, and to provide up to 8 HDMI signals using the first and second HDMI output modules 241E and 241F.

In an example, the configuration illustrated in FIG. 2C can be used to provide video signal information for display using a video wall. For example, the display wall can include 8 discrete display units, and each of the 8 display units can receive video signal information from a respective one of the HDMI outputs from the first and second HDMI output modules 241E and 241F.

In the example of FIG. 2C, the central processing unit module 241D includes a processor circuit that processes signal information, such as video signal information, for the system of modules included in at least the first backplane device 201. The central processing unit module 241D can process video information for each of the first, second, and third HDMI input modules 241A-241C, and for each of the first and second HDMI output modules 241E and 241F. Video signal information received using any one of the first, second, and third HDMI input modules 241A-241C can be processed using the central processing unit module 241D, and processed video signal information can be provided (e.g., to a display) using any one or more of the first and second HDMI output modules 241E and 241F.

In an example, the processor circuit included in the central processing unit module 241D includes a micro-processor assembly or controller unit, such as including one or more interface connections (e.g., USB, Ethernet, etc.) for receiving or providing information to another device. The processor circuit on-board the central processing unit module 241D optionally includes an ARM processor or similar device, a video processing unit, a graphics processing unit, or a general purpose processor circuit. The processor circuit can be configured to process audio, video, or other data. In an example, only a single central processing unit module is used with one or more backplane devices. Control data for the one or more backplane devices can be exchanged using a serial bus communication loop, and the bus can include a port for coupling with the central processing unit module. In an example, a central processing unit module can receive data or a command from an external device (e.g., a PC or other controller). In response, the module can issue a command via the serial bus communication loop to communicate the received data or command to an appropriate one of multiple available hardware modules that are communicatively coupled with the bus.

In an example that includes a video control system, the central processing unit module can receive a command to update a brightness characteristic for a portion of a video display. The command can be communicated via a serial bus communication loop to a video driver circuit on-board a hardware module, and the video driver circuit can implement the brightness update. In this manner, video processing (or one or more other functions) can be performed by a specified hardware module in response to a command, such as rather than relying on the processor on the central processing unit module to perform the video processing for the system.

In an example, the central processing unit module 241D can be configured to process signal information that is received from, or that is provided to, a backplane device other than the first backplane device 201, such as further described below at FIG. 4.

Figure 3:
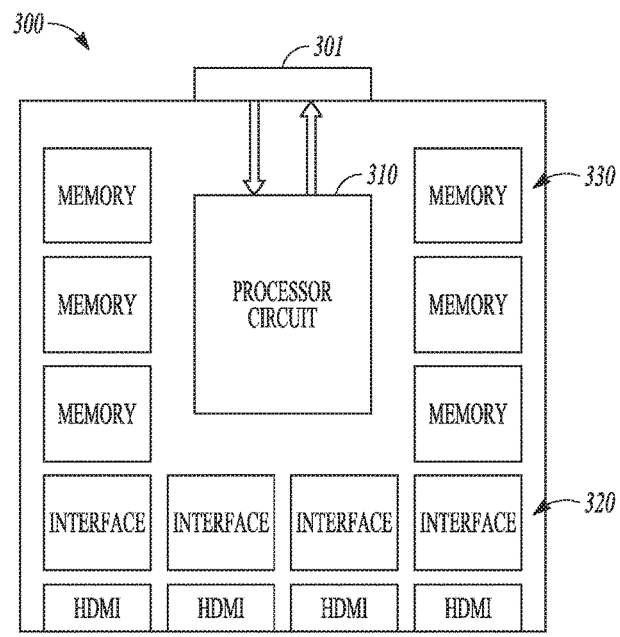
FIG. 3 illustrates generally an example of a hardware module for use with a backplane device.

FIG. 3 illustrates generally an example of a hardware module 300. The hardware module 300 can be coupled with a backplane device, such as the first backplane device 201 of FIGS. 2A-2C, using a connector 301. The connector 301 can be configured to mate with a corresponding connector on the first backplane device 201. In an example, the connector 301 is a PCIe connector, and the first backplane device 201 includes a PCIe receptacle, such as configured to use 1, 2, 4, 8, 12, 16, or 32 lanes for data communication. The hardware module 300 can optionally include one or more circuits for processing or storing signal information.

The hardware module 300 is configured as an audio, video, and/or data (AVD) processing module, and it includes a processor circuit 310, multiple HDMI interface circuits 320, and multiple memory circuits 330. The processor circuit 310 can include a software module (e.g., code embodied (1) on a non-transitory machine-readable medium or (2) in a transmission signal) or a hardware-implemented module. A hardware-implemented module can include a tangible unit capable of performing various programmable operations. In some examples, one or more computer systems (e.g., including a standalone, target or server computer system) or one or more processor circuits may be configured by software (e.g., an application or application portion) as a hardware-implemented module that operates to perform operations as described herein. In some examples, the hardware-implemented module can be implemented mechanically or electronically. For example, the hardware-implemented module can include dedicated circuitry or logic that is permanently configured, for example, as a special-purpose processor circuit, such as a field programmable gate array (FPGA) or an application-specific integrated circuit (ASIC), to perform specified operations. The hardware-implemented module can include programmable logic or circuitry (e.g., as encompassed within a general-purpose processor or other programmable processor) that can be temporarily configured by software to perform certain operations. The decision to implement a hardware-implemented module mechanically, in dedicated and permanently configured circuitry, or in temporarily configured circuitry (e.g., configured by software) may be driven by cost and time considerations.

In an example, the hardware module 300 corresponds to the first HDMI input module 241A in the example of FIG. 2C. The processor circuit 310 can be configured to receive audio and/or video information from one or more of the HDMI interface circuits 320. Optionally, the processor circuit 310 can process the received audio and/or video information, and then store the processed information in one or more of the memory circuits 330. Optionally, the processor circuit 310 can direct processed information to a serial bus communication loop (e.g., the serial bus communication loop 222 of FIGS. 2A-2C) via the connector 301, such as for transmitting the processed audio and/or video information to another hardware module or other device.

In an example, a hardware module for use with the first backplane device 201 includes only a memory circuit and is configured for use only as a signal storage or signal delay device. In an example, a hardware module for use with the first backplane device 201 includes a wireless transceiver circuit. When the hardware module is coupled to a backplane device, information received from the backplane device can be processed and broadcast by the hardware module with the wireless transceiver circuit. In an example, information can be received wirelessly using the wireless transceiver circuit and then processed using a hardware module that is communicatively coupled to the transceiver circuit, such as by way of one or more backplane devices.

In an example, a hardware module for use with the first backplane device 201 includes a central processing unit module, such as the central processing unit module 241D in the example of FIG. 2C. A central processing unit module includes a processor circuit for processing audio, video, or other data or signal information. In an example, each backplane device in a system of backplane devices includes at least one central processing unit module. In an example, only one central processing unit module is included in a system that includes multiple backplane devices. That is, for systems that include multiple backplanes, such as can be daisy-chained together, a single module having a central processing unit can be used to process signal information for use with any module in the system. In an example, a central processing unit module can process audio, video, data, or other information that is received using an input module in a first backplane device, and the central processing unit module can then direct the processed audio, video, data, or other information to an output module in the same or different first backplane device.

In an example, each hardware module that is coupled with a backplane device can receive, or have access to, any information exchanged using a serial bus communication loop of the backplane device. In an example, multiple hardware modules can be used to distribute signal processing tasks among multiple modules. For example, a first hardware module can include an input, a second hardware module can include an audio, video, or data signal processing circuit, and a third hardware module can include an output. In an example, any hardware module can include an output for providing information from or about one or more of the channels of the serial bus communication loop. The provided information can be used for live monitoring, such as for status information or signal content. In an example, a module can include input and output ports, such as for use with VOIP systems.

In an example, a hardware module for use with the first backplane device 201 includes a link module, or extender. The link module is configured to communicatively couple, or daisy-chain, multiple backplane devices. For example, the first backplane device 201 can include a first link module, such as coupled to the first module slot 221A. A second backplane device can include a second link module. The first and second link modules can be communicatively coupled to exchange data or other information, such as using an electrical, optical, or wireless transmission line.

Figure 4:
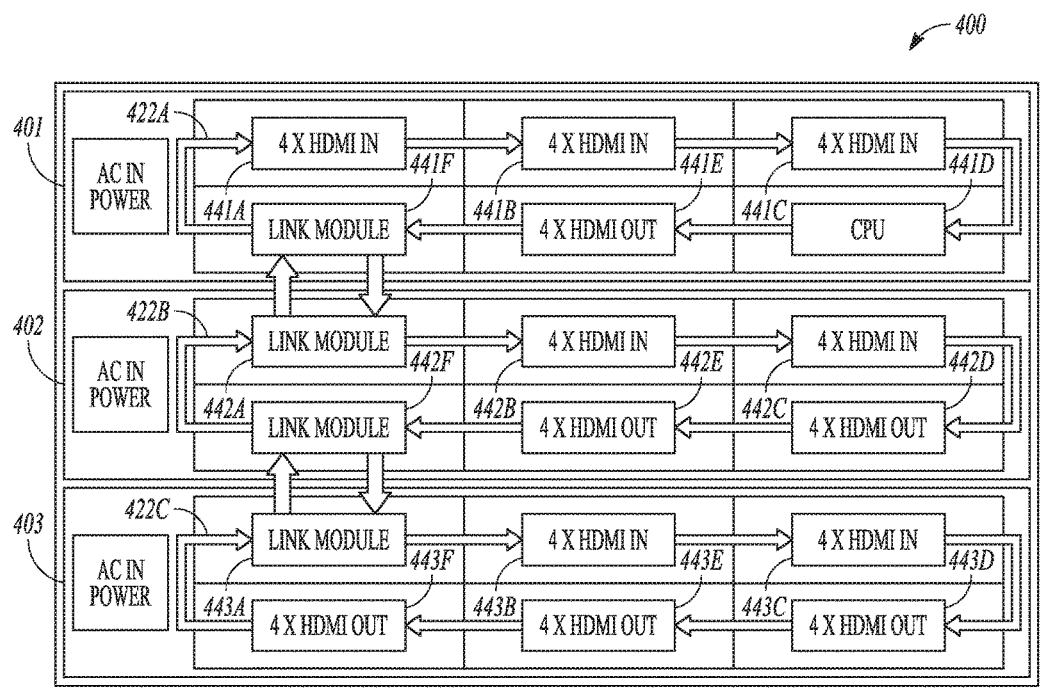
FIG. 4 illustrates generally an example of a system that includes multiple backplane devices that are communicatively coupled using link modules.

FIG. 4 illustrates generally an example of a system 400 that includes multiple backplane devices coupled using link modules. The system 400 includes a first backplane device 401, a second backplane device 402, and a third backplane device 403. Each of the first, second, and third backplane devices 401, 402, and 403, include respective groups of module slots, and in the example of FIG. 4, each of the module slots is occupied by a hardware module. The module slots are not labeled in the example of FIG. 4, however, the hardware modules are labeled.

In the example of FIG. 4, the first backplane device 401 is coupled with first, second, and third HDMI input modules 441A, 441B, and 441C, a central processing unit module 441D, a first HDMI output module 441E, and a first link module 441F. The second backplane device 402 is coupled with fourth and fifth HDMI input modules 442B and 442C, second and third HDMI output modules 441D and 441E, and second and third link modules 442A and 442F. The third backplane device 403 is coupled with sixth and seventh HDMI input modules 443B and 443C, fourth, fifth, and sixth HDMI output modules 443D, 443E, and 443F, and a fourth link module 443A.

The first backplane device 401 includes a first serial bus communication loop 422A, the second backplane device 402 includes a second serial bus communication loop 422B, and the third backplane device 403 includes a third serial bus communication loop 422C. In an example, each of the first, second, and third serial bus communication loops 422A, 422B, and 422C, are independent communication loops that share or exchange information only within their respective backplane devices. In an example, information can be exchanged between the first, second, and third backplane devices 401, 402, and 403, using the first, second, third, and fourth link modules 441F, 442A, 442F, and 443A.

In an example, a system-wide serial bus communication loop includes all of the hardware modules in the system 400. That is, the system-wide serial bus communication loop can extend, in turn, from the first HDMI input module 441A, to the second HDMI input module 441B, to the third HDMI input module 441C, to the central processing unit module 441D, to the first HDMI output module 441E, to the first link module 441F, to the second link module 442A, to the fourth HDMI input module 442B, to the fifth HDMI input module 442C, to the second HDMI output module 442D, to the third HDMI output module 442E, to the third link module 442F, to the fourth link module 443A, to the sixth HDMI input module 443B, to the seventh HDMI input module 443C, to the fourth HDMI output module 443D, to the fifth HDMI output module 443E, to the sixth HDMI output module 443F, to the fourth link module 443A, to the third link module 442F, to the second link module 442A, to the first link module 441F, and then the system-wide serial bus communication loop can return to the first HDMI input module 441A. Multi-cast information addressed to two or more of the hardware modules can be sent over the system-wide serial bus communication loop. For example, system-level brightness or contrast command information can be sent to all of the HDMI output modules in the system using the system-wide serial bus communication loop.

In an example, a link module can be substantially passive and can be configured to provide a communication link between adjacent backplane devices. In such examples, the link module can be an extension of the serial bus. A link module can optionally be used to screen any information that need not be transmitted to a downstream backplane device or hardware module, such as to conserve bandwidth or processing capacity for downstream modules along a system-wide serial bus communication loop.

In an example, a link module can include a processor circuit. The processor circuit can optionally be used to analyze one or more attributes of data transmitted by a serial bus communication loop. The processor circuit can be configured to determine what, if any, information to exchange with another backplane device. In this manner, a link module can be used to reduce a data load burden on one or more serial bus communication loops in a system.

In an example that includes using a link module with a processor circuit, the first link module 441F can receive a data signal using the first HDMI input module 441A. The data signal can include address or destination information that indicates that the data signal's payload is for use by the sixth HDMI output module 443F. The data signal can travel the first serial bus communication loop 422A until it reaches the first link module 441F. At the first link module 441F, the data signal is exchanged with the second link module 442A in the second backplane device 402.

The second link module 442A can send the data signal along the second serial bus communication loop 422B to the third link module 442F, and the third link module 442F can send the data signal along to the destination, the sixth HDMI output module 443F, via the fourth link module 443A. Alternatively, the second serial bus communication loop 422B can be bypassed. In an example, a processor circuit in the second link module 442A can analyze and recognize the address information in the data signal and, instead of sending the data signal along the second serial bus communication loop 422B, the second link module 442A can forward the data signal to the third link module 442F for subsequent transmission to the third backplane device 403, thereby bypassing the second serial bus communication loop 422B.

In an example, a dedicated communication path can extend between the second and third link modules 442A and 442F in the second backplane device 402. In an example, the segment of the second serial bus communication loop 422B extending between the second and third link modules 442A and 442F can be a bidirectional bus segment, and the second link module 442A can use the bidirectional bus segment to transmit the data signal. At the third link module 442F, the data signal can be transmitted to the fourth link module 443A. The data signal can then be routed to the sixth HDMI output module 443F by way of the third serial bus communication loop 422C, or by way of the segment of the third serial bus communication loop 422C extending between the fourth link module 443A and the sixth HDMI output module 443F.

In an example, a link module in a system, such as the system 400, can be coupled to a remote system for further processing, storing, or retrieving information from the serial bus. In the example of FIG. 4, at least one of the link modules can be configured to use a multiple channel, 50 Gbps communication line to reach a distant, remote system, such as via a fibre optic transmission line. The remote system can include a processor circuit that can, for example, insert or remove an audio, video, or data signal from the serial bus of the system.

The backplane devices discussed herein generally include a serial bus communication loop that includes multiple parallel communication paths extending about the loop. If one of the multiple parallel communication paths fails, then the audio, video, and/or data information associated with that communication path can be compromised or unusable. One or more hardware modules can optionally be configured to sense a failure, or line fault, and perform some mitigating action. In an example, a mitigating action includes generating and providing a notification to a user. In an example, a mitigating action includes dropping the failed communication path from use and re-routing signals along other paths. Because the serial bus communication loop extends generally among each of the module slots in a given system, a first data packet that would normally be routed along the faulty path can be re-routed along an available path that is being used for a second data packet. The first and second data packets can be multiplexed to share the available path, such as at the expense of the bandwidth of the available path, and a total system failure can be avoided.

Figure 5:
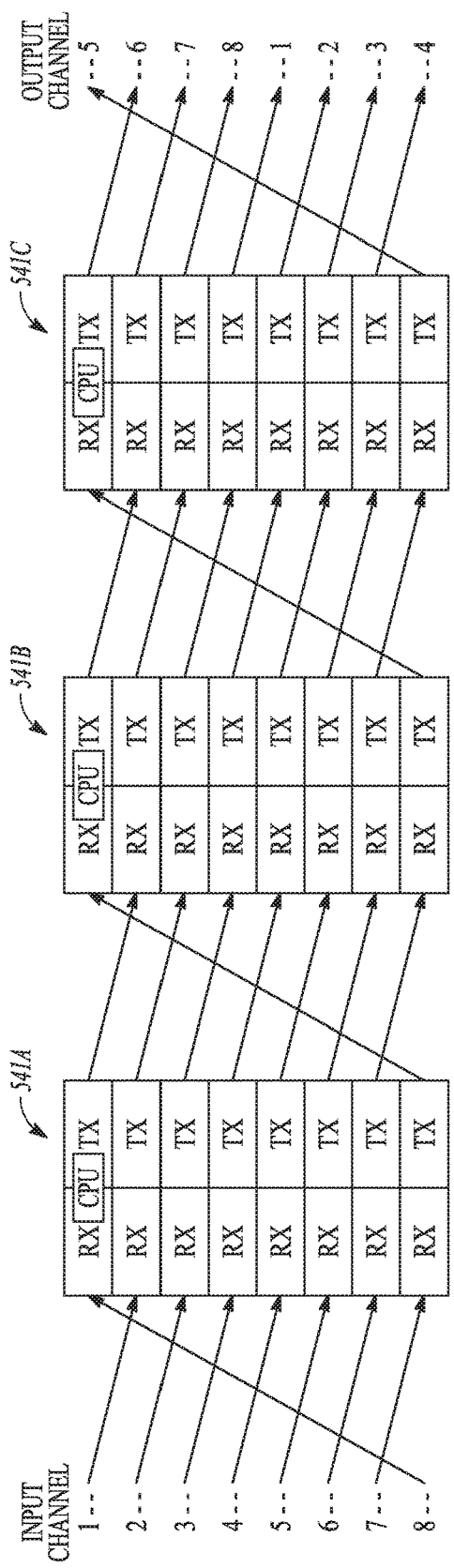
FIG. 5 illustrates generally an example that includes channel staggering.

FIG. 5 illustrates generally an example that includes channel staggering across multiple hardware modules that are optionally coupled to a common backplane device. The example of FIG. 5 includes first, second, and third hardware modules 541A, 541B, and 541C, and each of the hardware modules is configured to interface with a backplane slot that provides access to 8 RX/TX channels. In an example, channel staggering, such as according to FIG. 5, can minimize a need for a processor circuit on-board any given hardware module to receive or process all 8 of the RX/TX channels associated with the backplane device. For example, a processor circuit on-board a particular hardware module can "listen" to, and process information received from, only a particular one of the available 8 channels, rather than monitoring or processing all 8 channels simultaneously.

In the example of FIG. 5, each of the first, second, and third hardware modules 541A, 541B, and 541C, include substantially similar architecture. Each of the modules 541A, 541B, and 541C, includes a processor circuit or CPU that is configured to process only information on a bus position corresponding to channel 1. The other seven channels, 2-8, can optionally be pass-through channels. Referring to the example of FIG. 5, input channel 8 can be routed (using channel staggering in the backplane device or in the first hardware module 541A) to a bus position corresponding to channel 1. Input channels 1-7 can effectively bypass the first hardware module 541A, such as using a bypass mechanism on-board the first hardware module 541A or using a jumper or switch on-board the backplane device to which the first hardware module 541A is coupled. The second and third hardware modules 541B and 541C can similarly include respective CPUs and pass-through architecture. In the example of FIG. 5, only information received at input channels 6-8 are processed using the first, second, and third hardware modules 541A, 541B, and 541C, and then provided at output channels 6-8. Information received at input channels 1-5, if any, is substantially unchanged at output channels 1-5.

Using channel staggering, multiple input modules, such as having relatively few RX/TX channels, can be used on an 8 channel backplane, and the load from the multiple input modules can be "balanced" across all 8 available channels. In an example, output modules generally can be configured to use all available RX/TX channels in order to retrieve all available data from the backplane's serial bus communication loop. In an example, a staggering offset, or number of channels by which a given channel is offset, can be dynamically adjusted, such as automatically, such as depending on a number of hardware modules used with a particular backplane device. In an example, staggered signal routing can be hardwired in a backplane's architecture, or staggered signal routing can be performed on-board one or more hardware modules coupled to the backplane. In an example, channel staggering can be implemented or adjusted in response to a channel fault that is detected, such as automatically, by a backplane device or by a hardware module coupled to the backplane device.

In an example, a multiviewer input (rather than output) hardware module can be configured to receive multiple video signals, cascade or overlay the multiple received video signals, and provide an ultra-high resolution output (e.g., 8K or 7680×4320) using multiple different output hardware modules. That is, a multi-panel canvas can be provided.

In an example, multiple multiviewer input hardware modules can be used. A first multiviewer input hardware module (first MV module) can generate an initial, or blank, 8K signal and insert its own first windows with a depth value. A second multiviewer input hardware module (second MV module) can receive the output from the first MV module and insert second windows, such as when a depth value of the second windows indicates the second windows are in front of one or more of the first windows. In this manner, the second MV module can place one or more windows onto the 8K canvas established by the first MV module. The full, or flat, 8K signal can proceed along a serial bus communication loop, as described generally herein. Any output modules for use with the 8K canvas can retrieve or use a corresponding portion of the 8K signal. In an example, a final output resolution can be warped and corrected pixel information can be received from the output module's memory using a display engine.

Figure 6:
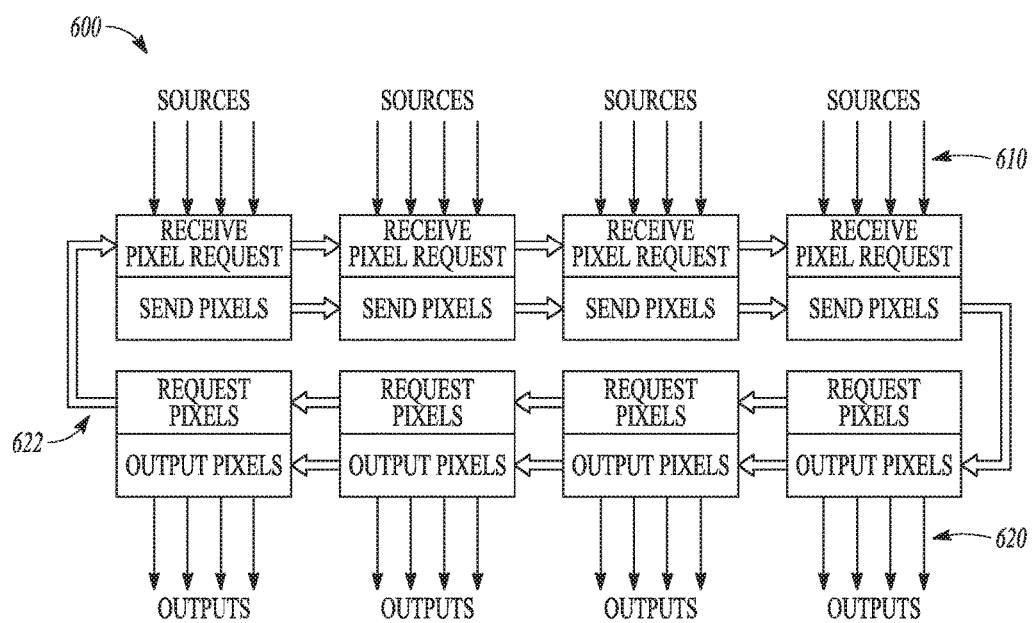
FIG. 6 illustrates generally an example that includes using an output hardware module to provide an 8K canvas.

FIG. 6 illustrates generally an example 600 that includes using an output hardware module, such as for use with an 8K canvas, to provide a data request for a portion of an 8K canvas. The request can circulate via a serial bus communication loop 622, such as to one or more input hardware modules. The one or more input hardware modules can receive input signals from one or more sources 610 and then generate a depth value for each pixel according to information in the request. In response, information from an input hardware module corresponding to the request can be returned to the output hardware module that initiated the request, such as using a different portion of the serial bus communication loop 622, and the information can be provided a display device using one or more outputs 620. In this example, only portions of the 8K canvas that get displayed are processed, and there may be no need to circulate the full 8K canvas about the serial bus communication loop 622. In this example, a maximum resolution of the system may not be limited by the canvas resolution. Further in this example, warping can be accomplished with the request because the output hardware module can be configured to automatically convert output X-Y coordinate information to warped, or canvassed, X-Y coordinates.

Figure 7:
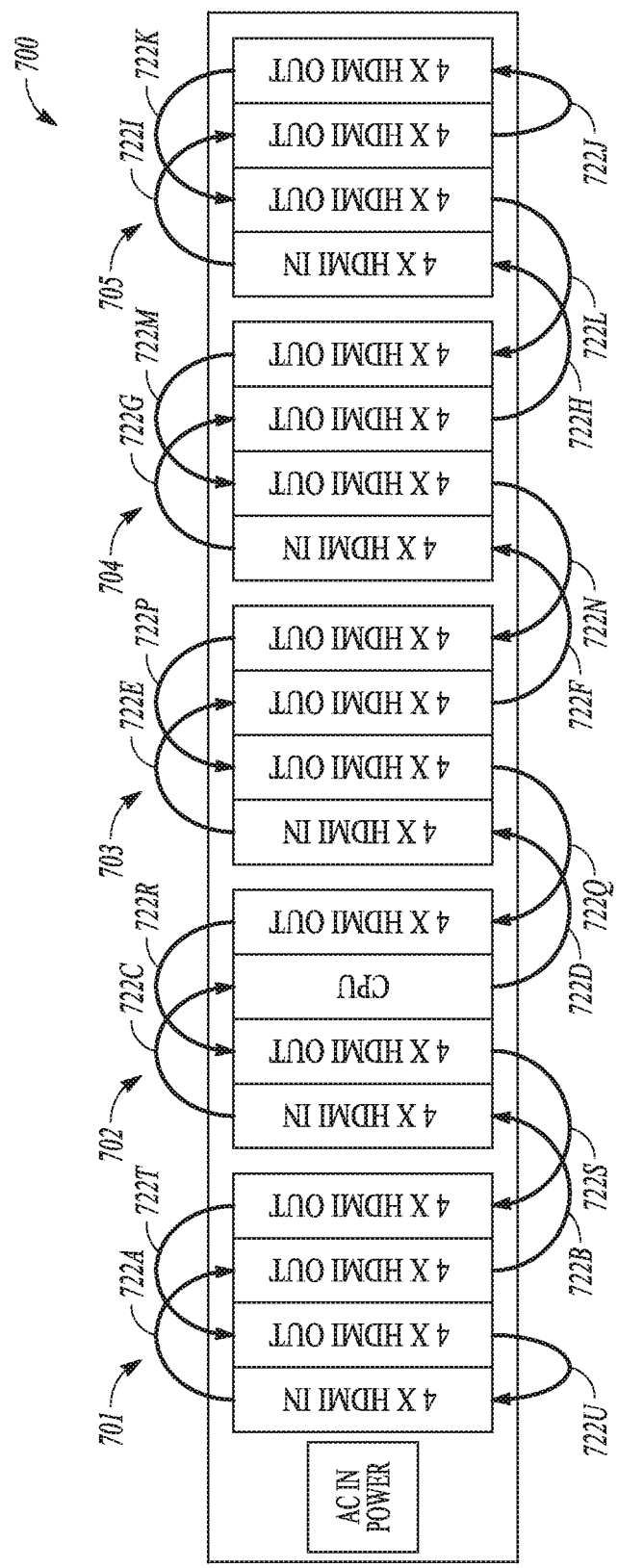
FIG. 7 illustrates generally an example of a schematic view of a backplane system populated with multiple different banks of hardware modules.

FIG. 7 illustrates generally an example of a schematic view of a backplane system 700 populated with multiple different groups or banks 701-705 of hardware modules. In the example of FIG. 7, each of four of the banks (banks 701, 703, 704, and 705) includes an HDMI input module and three HDMI output modules. Another of the banks (e.g., a second bank 702) includes one HDMI input module, two HDMI output modules, and a central processing unit module. As in the example of FIG. 2C, the example of FIG. 7 illustrates only one configuration among many possible configurations. In other examples, HDMI input and output modules are not used, and dedicated audio processing or audio input and output modules are used. In other examples, HDMI and dedicated audio processing modules are used together. In an example, the configuration illustrated in FIG. 7 can be used to provide video signal information for display using a video wall. In the example of FIG. 7, the central processing unit module in the second bank 702 is configured to process any or all of the signal information in the system 700.

The system 700 includes a serial bus communication loop 722. The serial bus communication loop 722 includes multiple parallel communication channels, or lanes, that extend in a loop among the multiple banks 701-705 and the respective hardware modules within each of the multiple banks 701-705. As similarly described above in the example of FIG. 2B, the serial bus communication loop 722 is configured to carry packetized data from one hardware module to another in the system 700.

The serial bus communication loop 722 electrically or optically couples each of the hardware modules in the multiple banks 701-705. The serial bus communication loop 722 includes multiple loop segments 722A-722U. The example of FIG. 7 illustrates generally one example of arranging the multiple loop segments 722A-722U such that each of the hardware modules in the system 700 are communicatively coupled by the loop. Other arrangements can be used as well. The serial bus communication loop 722 can include multiple parallel channel or signal paths, and each segment can include channel or signal paths that are substantially similar in terms of physical characteristics such as width, length, or material. In an example, each of the multiple channels in the serial bus communication loop 722 operates in the multiple-gigabit range.

Figure 8:
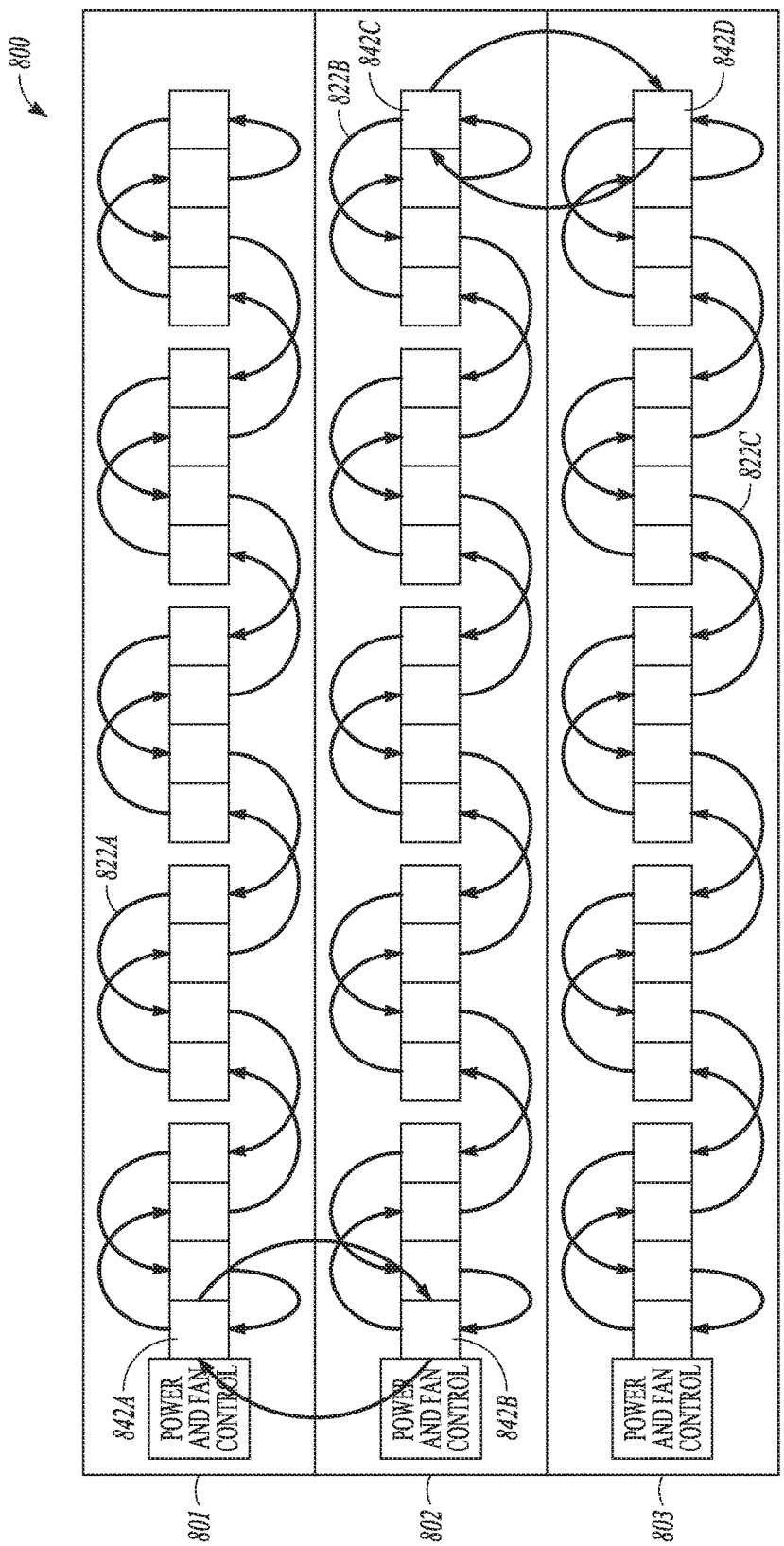
FIG. 8 illustrates generally an example of a schematic view of multiple backplane systems that are communicatively coupled using link modules.

FIG. 8 illustrates generally a schematic view 800 of first, second, and third backplane systems 801, 802, and 803, that can be communicatively coupled. In FIG. 8, each one of the first, second, and third backplane systems 801, 802, and 803, includes a respective serial bus communication loop 822A, 822B, and 822C. Each of the serial bus communication loops 822A, 822B, and 822C, can extend to each hardware module or module slot in its corresponding backplane system.

In an example, the serial bus communication loops 822A, 822B, and 822C are arranged within each of the first, second, and third backplane systems 801, 802, and 803, similarly to the arrangement of the serial bus communication loop 722 in the example of FIG. 7. In FIG. 8, the first and third backplane systems 801 and 803 include first and fourth link modules 842A and 842D, respectively, and the second backplane system 802 includes second and third link modules 842B and 842C. The link modules are provided to communicatively couple the serial bus communication loops 822A, 822B, and 822C.

In an example, a system-wide serial bus communication loop includes all of the hardware modules in the system that includes the first, second, and third backplane systems 801, 802, and 803. The link modules 842A-842D can be substantially passive and can be configured to provide a communication link between adjacent backplane systems. In such examples, the link modules can be an extension of the serial bus. In an example, one or more of the link modules 842A-842D includes a processor circuit. The link module processor circuit can be configured to analyze one or more attributes in data transmitted using the serial bus communication loops 822A-822C. The link module processor circuit can be configured to determine what, if any, information to exchange with another backplane system. In this manner, a link module can be used to reduce a data load burden on one or more of the serial bus communication loops in the example of FIG. 8.

Figure 9:
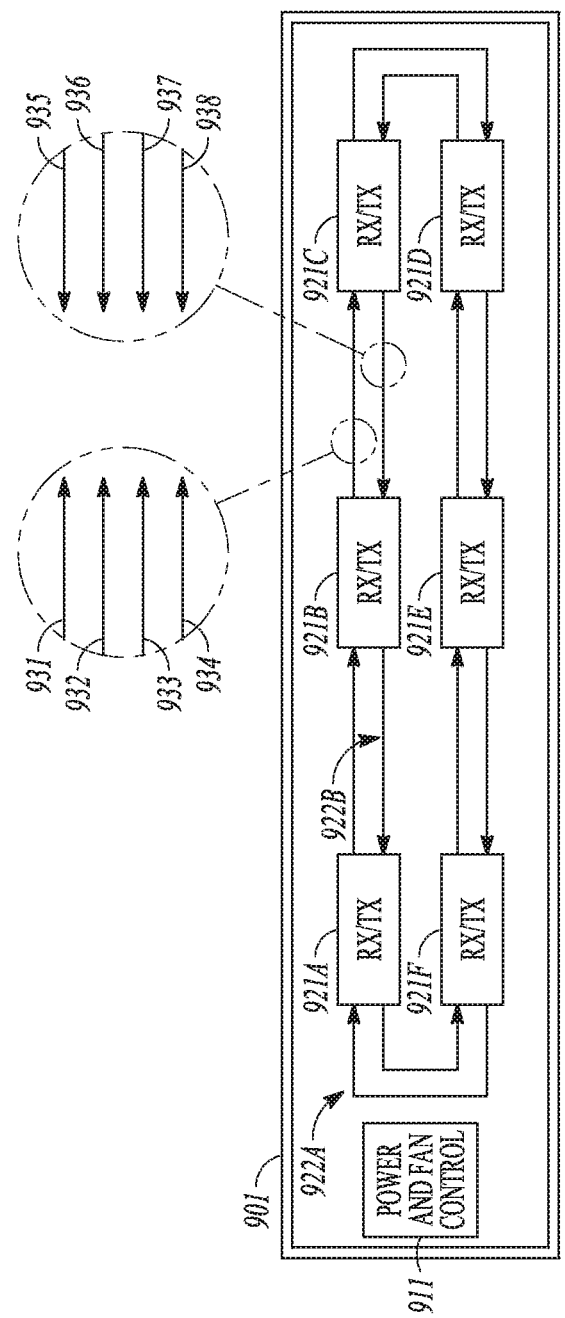
FIG. 9 illustrates generally an example of a schematic view of a bidirectional communication loop.

FIG. 9 illustrates generally an example of a schematic view of a backplane device 901 that is configured to use a bidirectional serial bus communication loop, including at least a first loop 922A and a second loop 922B. The communication loops 922A and 922B can be configured or used to exchange or transmit information in different directions, as further described below. The example of FIG. 9 further includes a power and fan control unit 911, such as can be used to provide power and/or cooling to any one or more hardware modules that may be coupled to respective ones of multiple module slots 921A-921F in the backplane device 901. The multiple module slots 921A-921F can be similarly configured as described above for the module slots 221A-221F in the examples of FIGS. 2A-2C. As in 221A-221F, the multiple module slots 921A-921F are represented by respective receive/transmit (RX/TX) blocks that indicate that the slots can be configured for receiving and/or transmitting information.

The first loop 922A includes one or more communication channels, or lanes, that extend in a loop in a first direction (as illustrated, clockwise) among the multiple module slots 921A-921F. As shown, the first loop 922A extends from 921A to 921B, then to 921C, then to 921D, then to 921E, then to 921F, and then returns to 921A to complete the loop. The second loop 922B includes one or more communication channels, or lanes, that extend in a loop in a different second direction (as illustrated, counter-clockwise) among the multiple module slots 921A-921F. As shown, the second loop 922B extends from 921A to 921F, then to 921E, then to 921D, then to 921C, then to 921B, and then returns to 921A.

Each of the first and second loops 922A and 922B includes multiple parallel data communication channels, and each channel provides a serial communication path in the loop among the multiple module slots 921A-921F. In the example of FIG. 9, the first loop 922A includes four parallel communication channels 931-934, such as can be provided using multiple parallel electrical or optical busses. The second loop 922B includes four parallel communication channels 935-938, such as can be provided using multiple parallel electrical or optical busses. Although the first and second loops 922A and 922B in FIG. 9 are illustrated as having the same number of channels, different numbers of channels can be used in the respective loops. In some examples, the number of channels configured for communication in a first direction can depend at least in part on a type of module that is used with one or more of the module slots in the backplane device. In another example, one or more of the channels can transmit information using a multiplexing scheme. As similarly described above in the example of the serial bus communication loop 222, the first and second loops 922A and 922B can each be configured to carry packetized data from one module slot to another.

Each of the multiple channels in the first and second loops 922A and 922B can operate in a multiple-gigabit range. In some examples, the different loops, or different channels within the loops, can operate at different speeds, such as at 3, 6, or 12 gigabits per second. Speed limits can be determined at least in part by a physical capacity of the channels comprising the loops, or by the processing or clock speeds on-board one or more hardware modules in a given system. In an example that includes a video system backplane device having the first and second loops 922A and 922B with 4 parallel channels each, each channel can operate at about 6 Gbps, and the total bandwidth of the backplane device can be about 48 Gbps.

As similarly described above in the examples of FIGS. 2A-2C, a hardware module coupled to a module slot completes an electrical or optical circuit through a given module slot to provide a portion of the first or second loops 922A or 922B. When a module slot is unoccupied by a hardware module, such as by a data processing or data storage hardware module, the loops can bypass the unoccupied slot to maintain communication among hardware modules coupled to the backplane device 901. In another example, a bypass switch, such as can be integrated with the backplane device 901, can be used to provide the communication path about an unoccupied module slot.

In the example of FIG. 9, the bidirectional communication loop that includes the first and second loops 922A and 922B can enable multiple modules to work together or communicate efficiently, such as without exchanging data using the entire length of the one-way serial bus communication loop 222 depicted in the example of FIG. 2B. Using the bidirectional communication topology in FIG. 9, the backplane device 901 provides efficient data exchange among a designated group of modules coupled to the backplane device 901, such as adjacent modules, but maintains data communication with the rest of the modules outside of the designated group.

For example, a local data loop can optionally be established between the first, second, and third module slots 921A, 921B, and 921C. Using the local data loop, data communication between modules coupled to these three slots can be expedited. In an example that includes using the local data loop 921A-921B-921C, data transmission between the third module slot 921C and the first module slot 921A can include only a two-segment data path. Without the bidirectional local data loop, data transmission between the third module slot 921C and the first module slot 921A would have to travel over a four-segment data path via the fourth, fifth, and sixth module slots 921D, 921E, and 921F. Thus, a physical data path length, and potential data processing interruptions or delays, between modules can be reduced using a bidirectional, local data communication loop.

In the example just described, in the event a fifth module coupled to the fifth module slot 921E wishes to communicate an instruction to a second module coupled to the second module slot 921B, the instruction can be passed along the first loop 922A until it reaches the first module slot 921A. A first module in the first module slot 921A can optionally serve as a gate to determine whether the instruction is permitted into the local data loop that includes the second module slot 921B. In another example, at least a portion of the first or second loops 922A or 922B can be reserved for serial communication among all module slots in the system, notwithstanding any local loops that use another portion of the first or second loops 922A or 922B.

In an example that includes a local data loop established using a backplane device, the modules in the local data loop can effectively function together as a unit, or as a system, such using only a first portion (e.g., half) of the backplane's bandwidth. Some modules may not require or use the same high through-put or clock speed as another module or group of modules coupled to the same backplane device, and establishing local data loops can enable these modules or systems to work concurrently using the same backplane device. Any data received at the end module of a local loop can be intelligently identified (e.g., using the end module, or using some other processor integrated with the backplane device) and the data can be optionally looped back internally to the other modules in the local loop, thereby keeping data confined to the group where the data is to be used or processed. A second portion of the backplane's bandwidth can optionally be used for continuous communication among all of the module slots in the backplane device, such as for CPU communications, for shared inputs or outputs, or for other information. That is, a first portion of the backplane's bandwidth can be devoted to a local loop, and a second portion of the same backplane's bandwidth can be devoted to maintaining communication across the backplane. Each of the portions can be independent of the next in terms of the bandwidth used. In an example, two or more local loops can overlap, such as using a third portion of the backplane's bandwidth.

In an example, multiple backplanes can be communicatively coupled such as described above in the examples of FIG. 4, 7, or 8. In an example that includes multiple backplanes that are each capable of using a bidirectional communication loop, the backplanes can be communicatively coupled such as show in the example of FIG. 10.

Figure 10:
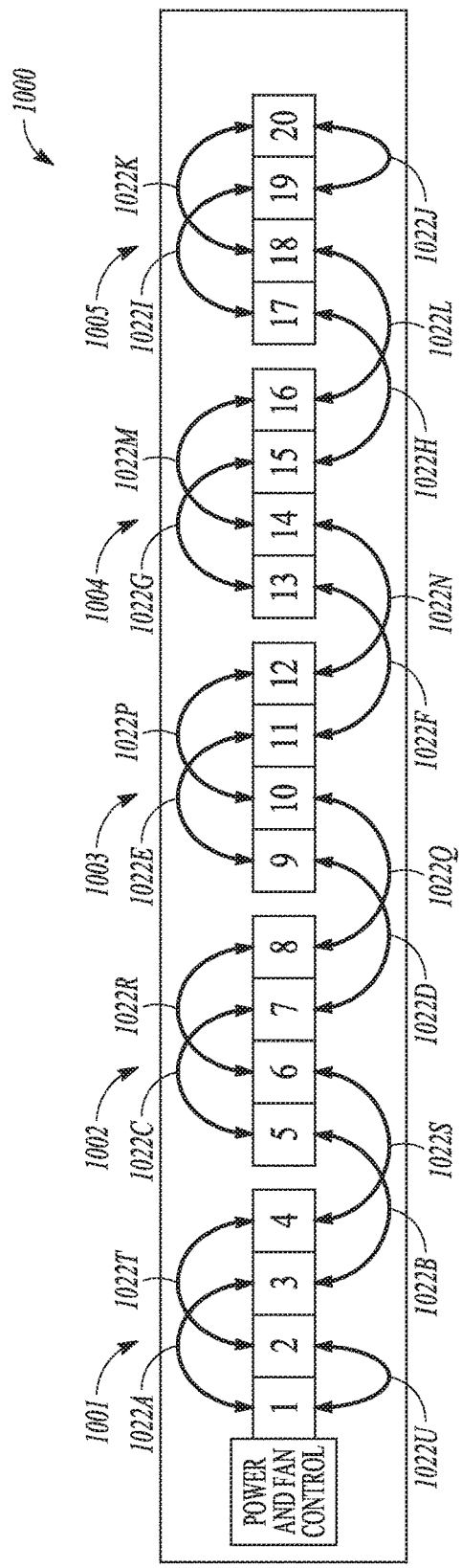
FIG. 10 illustrates generally an example of a schematic view of a backplane system populated with multiple different banks of hardware modules.

FIG. 10 illustrates generally an example of a schematic view of a backplane system 1000 populated with multiple different groups or banks 1001-1005 of hardware modules. In the example of FIG. 10, the banks can include, among other things, HDMI input modules, HDMI output modules, processing unit modules, or other modules. The multiple modules in each bank are represented generally by the numerals 1 through 20 for brevity.

The system 1000 includes a serial bus communication loop 1022, such as configured for bidirectional communication between modules in the system (see, e.g., FIG. 9). The serial bus communication loop 1022 includes multiple parallel communication channels, or lanes, that extend in a loop among the multiple banks 1001-1005 and the respective hardware modules within each of the multiple banks 1001-1005. As similarly described above in the example of FIG. 2B, the serial bus communication loop 1022 is configured to carry packetized data from one hardware module to another in the system 1000.

The serial bus communication loop 1022 electrically or optically couples each of the hardware modules in the multiple banks 1001-1005, and the serial bus communication loop 1022 includes multiple loop segments 1022A-1022U. Any one or more of the loop segments 1022A-1022U can optionally be configured for bidirectional communication, such as can be used to provide a local data loop among two or more modules. The example of FIG. 10 illustrates generally one example of arranging the multiple loop segments 1022A-1022U such that each of the hardware modules in the system 1000 is communicatively coupled using the loop. Other arrangements can be used as well. The serial bus communication loop 1022 can include multiple parallel channel or signal paths, and each segment can include channel or signal paths that are substantially similar in terms of physical characteristics such as width, length, or material. In an example, each of the multiple channels in the serial bus communication loop 1022 operates bidirectionally and in the multiple-gigabit range.

Figure 11:
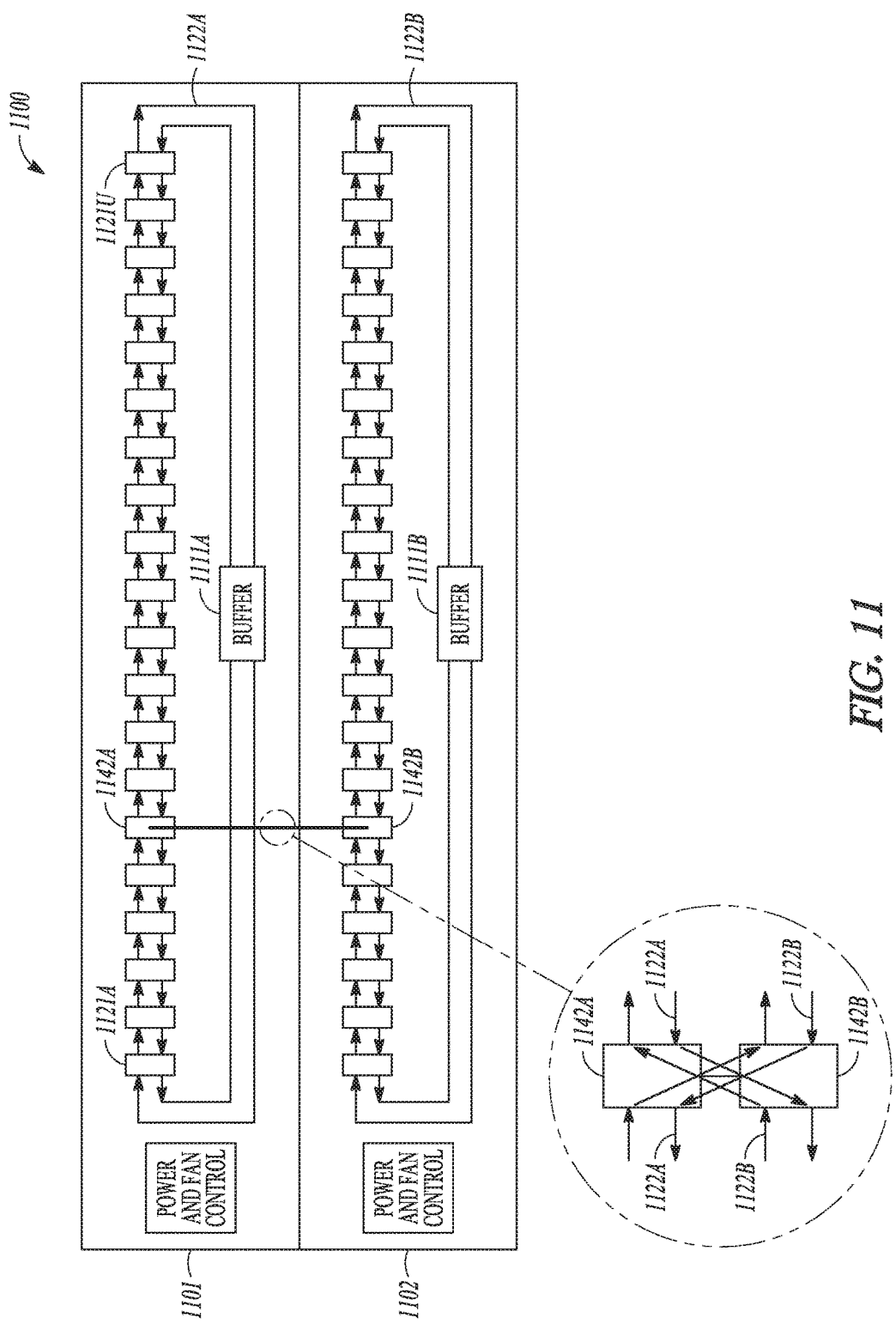
FIG. 11 illustrates generally an example of a schematic view of multiple backplane systems that are communicatively coupled using a bidirectional data communication link.

FIG. 11 illustrates generally a schematic view 1100 of first and second backplane systems 1101 and 1102 that can be communicatively coupled. In FIG. 11, each one of the first and second backplane systems 1101 and 1102 includes a respective one of first and second serial bus communication loops 1122A and 1122B, and each of the serial bus communication loops can include one or more portions that are configured for bidirectional communication. Each of the serial bus communication loops 1122A and 1122B can extend to each hardware module or module slot in its corresponding backplane system.

In the example of FIG. 11, the first and second backplane systems 1101 and 1102 include respective first and second buffer circuits 1111A and 1111B. The first buffer circuit 111A communicatively couples first and second end modules 1121A and 1121U in the system 1101. The second buffer circuit 111B communicatively couples each end module in the system 1102. When a buffer circuit is applied in the manner illustrated in FIG. 11, the staggered or alternating data coupling of multiple modules, such as shown in the example of FIG. 10, can optionally be avoided.

In FIG. 11, the first and second backplane systems 1101 and 1102 include first and second link modules 1142A and 1142B, respectively. The link modules communicatively couple the serial bus communication loops 1122A and 1122B. The example of FIG. 11 includes a detail view illustrating how portions of the serial bus communication loop 1122A, corresponding to the first backplane system 1101, can exchange information with the serial bus communication loop 1122B, corresponding to the second backplane system 1102. For example, information on the clockwise bus of the first serial bus communication loop 1122A can be transmitted to the clockwise bus of the second serial bus communication loop 1122B. When the same or different information returns, such as using the counter-clockwise bus of the second serial bus communication loop 1122B, the information can be transmitted to the counter-clockwise bus of the first serial bus communication loop 1122A.

In an example, a system-wide serial bus communication loop includes all of the hardware modules in the system that includes the first and second backplane systems 1101 and 1102. The link modules 1142A and 1142B can be substantially passive and can be configured to provide a communication link between adjacent backplane systems. In such examples, the link modules can be an extension of the serial bus. In an example, one or more of the link modules can include a processor circuit. The link module processor circuit can be configured to analyze one or more attributes in data transmitted using the serial bus communication loops 1122A or 1122B. The link module processor circuit can use a result of the analysis to determine what, if any, information to exchange between the backplane systems. In this manner, a link module can be used to reduce a local data load burden on one or more of the serial bus communication loops in the example of FIG. 11.

NOTES

Method examples described herein can be machine or computer-implemented at least in part. For example, a processor circuit, or some other controller or processor circuit, can be used to implement at least a portion of one or more of the methods discussed herein. Some examples can include a tangible, computer-readable medium or machine-readable medium encoded with instructions that are operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An apparatus comprising:
a first backplane device for exchanging audio information, video information, and/or data among multiple audio, video, and/or data (AVD) processing or AVD storage hardware modules, the first backplane device comprising:
a first group of AVD module slots, each of the module slots configured to receive an AVD processing or AVD storage hardware module; and
a first serial bus communication loop to electrically or optically couple each of the AVD module slots in the first group of module slots wherein the first serial bus communication loop extends from a first hardware module slot to a second hardware module slot, from the second hardware module slot to an nth hardware module slot, and from the nth hardware module slot to the first hardware module slot to complete the communication loop;
wherein the first serial bus communication loop is maintained when at least one of the AVD module slots in the first group is unoccupied by an AVD processing or AVD storage hardware module.

2. The apparatus of claim 1, wherein each AVD module slot of the first group includes multiple parallel pairs of input/output ports corresponding to different channels, wherein each of the ports is configured to receive or transmit audio information, video information, and/or data substantially concurrently, and wherein the first serial bus includes a number of parallel data communication paths that corresponds to a number of the different channels.

3. The apparatus of claim 1, further comprising one of (1) a jumper inserted in a first unoccupied AVD module slot or (2) a bypass switch that is integrated with the first backplane device, wherein the jump or bypass switch is configured to maintain the first serial bus communication loop through the first unoccupied AVD module slot.

4. The apparatus of claim 1, comprising:
a second backplane device for exchanging audio information, video information, and/or data among multiple AVD processing or AVD storage hardware modules, the second backplane device comprising a second group of AVD processing or AVD storage module slots; and
a link module that communicatively couples the first group of AVD module slots of the first backplane device and the second group of AVD module slots of the second backplane device to provide a system-wide serial bus communication loop among all of the module slots in the first and second groups of AVD module slots.

5. The apparatus of claim 1, wherein the first serial bus communication loop is configured to bidirectionally couple and least two of the AVD module slots in the first group of AVD module slots.

6. The apparatus of claim 1, wherein the first group of AVD module slots includes at least first, second, and third AVD module slots, wherein the first and second AVD module slots are communicatively coupled by a first portion of the first serial bus communication loop, and wherein the second and third AVD module slots are communicatively coupled by a second portion of the first serial bus communication loop; and
wherein the first backplane device further comprises a data buffer circuit that communicatively couples the first and third AVD module slots.

7. The apparatus of claim 2, wherein:
a first AVD module slot of the first group includes output ports corresponding to first and second channel positions of the first AVD module slot; and
a second AVD module slot of the first group includes input ports corresponding to first and second channel positions of the second AVD module slot; and
wherein the first serial bus communication loop includes:
a first information communication path that extends from the first channel position output port of the first AVD module slot to the second channel position input port of the second AVD module slot.

8. The apparatus of claim 4, wherein the second backplane device includes a second serial bus communication loop to electrically or optically couple each of the module slots in the second group of AVD module slots, wherein the second serial bus communication loop is maintained when at least one of the module slots in the second group is unoccupied by an AVD processing or AVD storage hardware module.

9. The apparatus of claim 4, wherein the link module further establishes backplane-specific serial bus communication loops among module slots only in respective ones of the first and second groups of AVD module slots, such that the system includes the first serial bus communication loop for the first backplane device, a second serial bus communication loop for the second backplane device, and the system-wide serial bus communication loop for the first and second backplanes.

10. The apparatus of claim 9, wherein the link module is configured to exchange, between the first and second backplane devices, only information originating from one of the backplane devices that is addressed to a location in the other one of the backplane devices.

11. A modular system comprising:
a first backplane device that includes a first group of module slots and a first serial bus that communicatively couples each of the module slots, wherein each slot of the first group of module slots is configured to receive a processor module or a memory module, and the first serial bus bypasses any module slot in the first group of module slots that is unoccupied by a module wherein the first serial bus is a first communication loop that extends from a first slot in the first group of module slots to a second slot in the first group of module slots, from the second slot to an nth slot in the first group of module slots, and from the nth slot to the first slot in the first group of module slots to complete the first communication loop;
a second backplane device that includes a second group of module slots and a second serial bus that communicatively couples each of the module slots, wherein each slot of the second group of module slots is configured to receive a processor module or a memory module, and the second serial bus bypasses any module slot in the second group of module slots that is unoccupied by a module wherein the second serial bus is a second communication loop that extends from a first slot in the second group of module slots to a second slot in the second group of module slots, from the second slot to an ith slot in the second group of module slots, and from the ith slot to the first slot in the second group of module slots to complete the second communication loop;

a first processor module including at least one processor circuit, the first processor module coupled to a slot in one of the first and second groups of module slots, and the at least one processor circuit is configured to process a packetized data signal received from, or for output to, a different processor module or memory module in either of the first and second groups of module slots; and a link that communicatively couples the first and second groups of module slots to establish a system-level serial data loop among modules coupled to any module slot in the system.

12. The system of claim 11, wherein the first serial bus is one of an electrical bus or an optical bus that is configured to transmit one of an electrical signal or an optical signal, respectively.

13. The system of claim 11, comprising a jumper coupled with a first module slot in the first group of module slots, wherein the jumper provides a communication path, along a portion of the first serial bus that includes the first module slot, to bypass the first module slot.

14. The system of claim 11, comprising a hardware jumper switch or software-actuated jumper switch coupled with a first module slot in the first group of module slots, wherein actuation of the jumper switch enables or disables a communication path along a portion of the first serial bus that includes the first module slot.

15. The system of claim 11, wherein the link further establishes first and second serial data loops among module slots only in respective ones of the first and second groups of module slots, such that the system includes the system-level serial data loop among all module slots in the system, the first serial data loop among only the first group of module slots, and the second serial data loop among only the second group of module slots.

16. The system of claim 11, wherein the link includes first and second data communication channels that couple the first and second groups of module slots to establish the system-level serial data loop, wherein the first data communication channel exchanges information from the first group to the second group of module slots, and wherein the second data communication channel exchanges information from the second group to the first group of module slots.

17. An apparatus comprising:
a first backplane device for use in a video display control system, the first backplane device comprising:

a first group of video signal processing or video signal storage module slots, each of the module slots configured to receive a video signal processing or video signal storage hardware module; and a first serial bus communication loop to electrically or optically couple each of the module slots in the first group of module slots wherein the first serial bus communication loop extends from a first hardware module slot to a second hardware module slot, from the second hardware module slot to an nth hardware module slot, and from the nth hardware module slot to the first hardware module slot to complete the communication loop;

wherein the first serial bus communication loop is maintained when at least one of the module slots in the first group is unoccupied by a video signal processing or video signal storage hardware module.

18. The apparatus of claim 17, comprising a first jumper, wherein the first serial bus communication loop is maintained through a first module slot in the first group, when the first module slot is unoccupied, using the first jumper to electrically or optically provide a communication channel through the first module slot.

19. The apparatus of claim 17, comprising a first video signal processing hardware module coupled to a first module slot in the first group;

wherein the video signal processing hardware module is configured to receive video signal information, via the first serial bus communication loop, from a different second hardware module coupled to a second module slot in the first group; and wherein the video signal processing hardware module is configured to provide a processed video signal, via the first serial bus communication loop, to a different third hardware module coupled to a third module slot in the first group.

20. The apparatus of claim 17, comprising:
a second backplane device for use in the video display control system, the second backplane device comprising a second group of video signal processing or video signal storage module slots; and
a link module that communicatively couples the first group of module slots of the first backplane device and the second group of module slots of the second backplane device to provide a system-wide serial bus communication loop among modules coupled to any module slot in the video display control system.

* * * * *